US010852429B2

(12) United States Patent
Gatland

(10) Patent No.: US 10,852,429 B2
(45) Date of Patent: Dec. 1, 2020

(54) SONAR HISTORY DISPLAY CONTROL SYSTEMS AND METHODS

(71) Applicant: FLIR Belgium BVBA, Meer (BE)

(72) Inventor: Christopher D. Gatland, Fareham (GB)

(73) Assignee: FLIR BELGIUM BVBA, Meer (BE)

( * ) Notice: Subject to any disclaimer, the term of this patent is extended or adjusted under 35 U.S.C. 154(b) by 342 days.

(21) Appl. No.: 16/029,497

(22) Filed: Jul. 6, 2018

(65) Prior Publication Data

US 2018/0313953 A1 Nov. 1, 2018

Related U.S. Application Data

(63) Continuation-in-part of application No. 15/353,579, filed on Nov. 16, 2016, now Pat. No. 10,416,307.
(Continued)

(51) Int. Cl.
*G01S 15/10* (2006.01)
*G01S 15/89* (2006.01)
(Continued)

(52) U.S. Cl.
CPC .......... *G01S 15/8902* (2013.01); *G01S 7/521* (2013.01); *G01S 7/524* (2013.01); *G01S 7/527* (2013.01);
(Continued)

(58) Field of Classification Search
CPC ...... G01S 15/8902; G01S 15/86; G01S 7/527; G01S 7/6218; G01S 7/6281; G01S 7/6272; G01S 7/524; G01S 7/521; G01S 7/6263; G01S 15/89; G01S 15/10; G01S 15/96; G06F 3/04883; G06F 3/033; G06F 3/0482

See application file for complete search history.

(56) References Cited

U.S. PATENT DOCUMENTS 4,970,700 A 11/1990 Gilmour et al.
5,142,649 A 8/1992 O'Donnell
(Continued)

FOREIGN PATENT DOCUMENTS

EP 2626721 8/2013
GB 2541839 3/2017
(Continued)

*Primary Examiner* — Daniel Pihulic
(74) *Attorney, Agent, or Firm* — Haynes and Boone, LLP

(57) ABSTRACT

Techniques are disclosed for systems and methods to provide accurate and intuitive control over the display of sonar image data provided by sonar systems for mobile structures. A sonar system includes a user interface and a logic device configured to receive and display multiple different sonar image data sets from multiple different types of transducer modules to a user. The logic device is configured to render a historical view selector on a display of the user interface, where the historical view selector is configured to provide for selection of a particular view time in a period of time corresponding to the first and/or second sonar image data, receive user input identifying a selected view time within the range of time, and render first and second portions of the first and second image data corresponding to the selected view time on the display of the user interface.

20 Claims, 14 Drawing Sheets

Related U.S. Application Data which is a continuation of application No. PCT/US2015/032304, filed on May 22, 2015, application No. 16/029,497, which is a continuation-in-part of application No. 15/592,134, filed on May 10, 2017, now Pat. No. 10,338,195, and a continuation-in-part of application No. 15/353,579.

(60) Provisional application No. 62/532,897, filed on Jul. 14, 2017, provisional application No. 62/005,838, filed on May 30, 2014, provisional application No. 62/335,620, filed on May 12, 2016.

(51) Int. Cl.
| | |
|---|---|
| *G06F 3/0488* | (2013.01) |
| *G01S 7/527* | (2006.01) |
| *G01S 7/62* | (2006.01) |
| *G01S 7/524* | (2006.01) |
| *G01S 7/521* | (2006.01) |
| *G01S 15/86* | (2020.01) |
| *G06F 3/033* | (2013.01) |
| *G01S 15/96* | (2006.01) |
| *G06F 3/0482* | (2013.01) |

(52) U.S. Cl.
CPC .......... *G01S 7/6218* (2013.01); *G01S 7/6263* (2013.01); *G01S 7/6272* (2013.01); *G01S 7/6281* (2013.01); *G01S 15/10* (2013.01); *G01S 15/86* (2020.01); *G01S 15/89* (2013.01); *G06F 3/04883* (2013.01); *G01S 15/96* (2013.01); *G06F 3/033* (2013.01); *G06F 3/0482* (2013.01)

(56) References Cited

U.S. PATENT DOCUMENTS

| | | | |
|---|---|---|---|
| 5,200,931 | A | 4/1993 | Kosalos et al. |
| 5,412,618 | A | 5/1995 | Gilmour |
| 5,530,680 | A | 6/1996 | Whitehurst |
| 5,561,641 | A | 10/1996 | Nishimori et al. |
| 5,675,552 | A | 10/1997 | Hicks et al. |
| 5,771,205 | A | 6/1998 | Currier et al. |
| 5,887,376 | A | 3/1999 | Currier et al. |
| 6,050,945 | A | 4/2000 | Peterson et al. |
| 6,934,657 | B1 | 8/2005 | Carlson et al. |
| 8,300,499 | B2 | 10/2012 | Coleman et al. |
| 8,305,840 | B2 | 11/2012 | Maguire |
| 8,677,920 | B1 | 3/2014 | Jeng |
| 9,268,020 | B2 | 2/2016 | Coleman |
| 9,298,079 | B2 | 3/2016 | Thomas et al. |
| 10,416,307 | B2 * | 9/2019 | Stokes ................ G10K 11/006 |
| 10,444,349 | B2 * | 10/2019 | Gatland .................. G01S 7/003 |
| 10,545,226 | B2 * | 1/2020 | Wigh ...................... G01S 15/42 |
| 2004/0158147 | A1 | 8/2004 | Shifrin |
| 2013/0208568 | A1 | 8/2013 | Coleman |
| 2014/0010049 | A1 | 1/2014 | Proctor |
| 2016/0259520 | A1 | 9/2016 | Gatland |
| 2017/0059705 | A1 | 3/2017 | Stokes et al. |
| 2017/0285134 | A1 | 10/2017 | Stokes et al. |
| 2018/0313953 | A1 * | 11/2018 | Gatland ................ G01S 7/6272 |

FOREIGN PATENT DOCUMENTS

| | | |
|---|---|---|
| WO | WO 2013/063515 | 5/2013 |
| WO | WO 2015/183754 | 12/2015 |

\* cited by examiner

SONAR HISTORY DISPLAY CONTROL SYSTEMS AND METHODS

CROSS-REFERENCE TO RELATED APPLICATIONS

This application claims the priority to and the benefit of U.S. Provisional Patent Application No. 62/532,897 filed Jul. 14, 2017 and entitled "SONAR HISTORY DISPLAY CONTROL SYSTEMS AND METHODS," which is incorporated herein by reference in its entirety.

This application is a continuation-in-part of U.S. patent application Ser. No. 15/353,579 filed Nov. 16, 2016 and entitled "MULTICHANNEL SONAR SYSTEMS AND METHODS," which is a continuation of International Patent Application No. PCT/US2015/032304 filed May 22, 2015 and entitled "MULTICHANNEL SONAR SYSTEMS AND METHODS," which claims the benefit of and priority to U.S. Provisional Patent Application No. 62/005,838 filed May 30, 2014 and entitled "MULTICHANNEL SONAR SYSTEMS AND METHODS," all of which are hereby incorporated by reference in their entirety.

This application is also a continuation-in-part of U.S. patent application Ser. No. 14/592,134 filed May 10, 2017 and entitled "MULTICHANNEL SONAR SYSTEMS AND METHODS," which claims priority to and the benefit of U.S. Provisional Patent Application No. 62/335,620 filed May 12, 2016 and entitled "NETWORKABLE SONAR SYSTEMS AND METHODS," all of which are hereby incorporated by reference in their entirety. U.S. patent application Ser. No. 14/592,134 is also a continuation-in-part of U.S. patent application Ser. No. 15/353,579 filed Nov. 16, 2016 and entitled "MULTICHANNEL SONAR SYSTEMS AND METHODS," which is a continuation of International Patent Application No. PCT/US2015/032304 filed May 22, 2015 and entitled "MULTICHANNEL SONAR SYSTEMS AND METHODS," which claims priority to and the benefit of U.S. Provisional Patent Application No. 62/005,838 filed May 30, 2014 and entitled "MULTICHANNEL SONAR SYSTEMS AND METHODS," all of which are hereby incorporated by reference in their entirety.

TECHNICAL FIELD

One or more embodiments of the invention relate generally to sonar systems and more particularly, for example, to systems and methods for providing historical view display control of multiple sonar imagery renderings.

BACKGROUND

Sonar may be used to perform bathymetry, detect underwater hazards, find fish, and/or otherwise assist in navigation by producing data and/or imagery of a water column beneath a watercraft. Conventional sonar systems often include one or more independently operating sonar transducers with temporally and/or spatially non-overlapping beams arranged to help differentiate ensonifications and produce traditionally recognizable sonar imagery.

Current user interfaces used to view sonar image data derived from multiple sonar transducers are typically visually cluttered with multiple display view controllers and/or preview panes attached to each window/display view of sonar image data, and a user can quickly lose track of critical navigational hazards and/or desired navigational features as a result. At the same time, consumer market pressures and convenience dictate easier to use systems that include more features and produce higher quality resulting imagery. Thus, there is a need for an improved methodology to provide intuitive, feature-rich, and flexible-use sonar systems, particularly in the context of providing relatively high quality enhanced sonar data and/or imagery for display to a user.

SUMMARY

Techniques are disclosed for systems and methods to provide accurate and intuitive control over the display of sonar image data provided by sonar systems for mobile structures. A sonar system may include multiple different types of transducer modules and/or be configured to display corresponding multiple different types of sonar image data to a user. One or more sonar transducer assemblies may be configured to support and protect the transducer modules and associated electronics and sensors, to physically and/or adjustably couple to a mobile structure, and/or to provide a simplified interface to other systems coupled to the mobile structure. Resulting sonar data and/or imagery may be displayed to a user and/or used to adjust various operational systems of the mobile structure.

In various embodiments, a sonar system and/or sonar transducer assembly may include an orientation sensor, a position sensor, a gyroscope, an accelerometer, and/or one or more additional sensors, actuators, controllers, user interfaces, mapping systems, and/or other modules mounted to or in proximity to a vehicle. Each component of the system may be implemented with a logic device adapted to form one or more wired and/or wireless communication links for transmitting and/or receiving sensor signals, control signals, or other signals and/or data between the various components.

In one embodiment, a system may include a user interface configured to display at least first and second sonar image data sets to a user of a mobile structure and a logic device configured to communicate with the user interface. The first and second sonar image data sets may be derived from corresponding first and second time series of acoustic returns received by respective first and second sonar transducer modules coupled to the mobile structure. The logic device may be configured to render a historical view selector on a display of the user interface, where the historical view selector is configured to provide for selection of a particular view time in a period of time corresponding to the first and/or second sonar image data sets; receive user input identifying a selected view time within the period of time; and render first and second portions of the first and second image data sets, corresponding to the selected view time, on the display of the user interface.

In another embodiment, a method may include rendering a historical view selector on a display of a user interface configured to accept user input and display at least first and second sonar image data sets to a user of a mobile structure, where the first and second sonar image data sets are derived from corresponding first and second time series of acoustic returns received by respective first and second sonar transducer modules coupled to the mobile structure, and where the historical view selector is configured to provide for selection of a particular view time in a period of time associated with the first and/or second sonar image data sets; receiving user input identifying a selected view time within the period of time; and rendering first and second portions of the respective first and second image data sets, corresponding to the selected view time, on the display of the user interface.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1A:
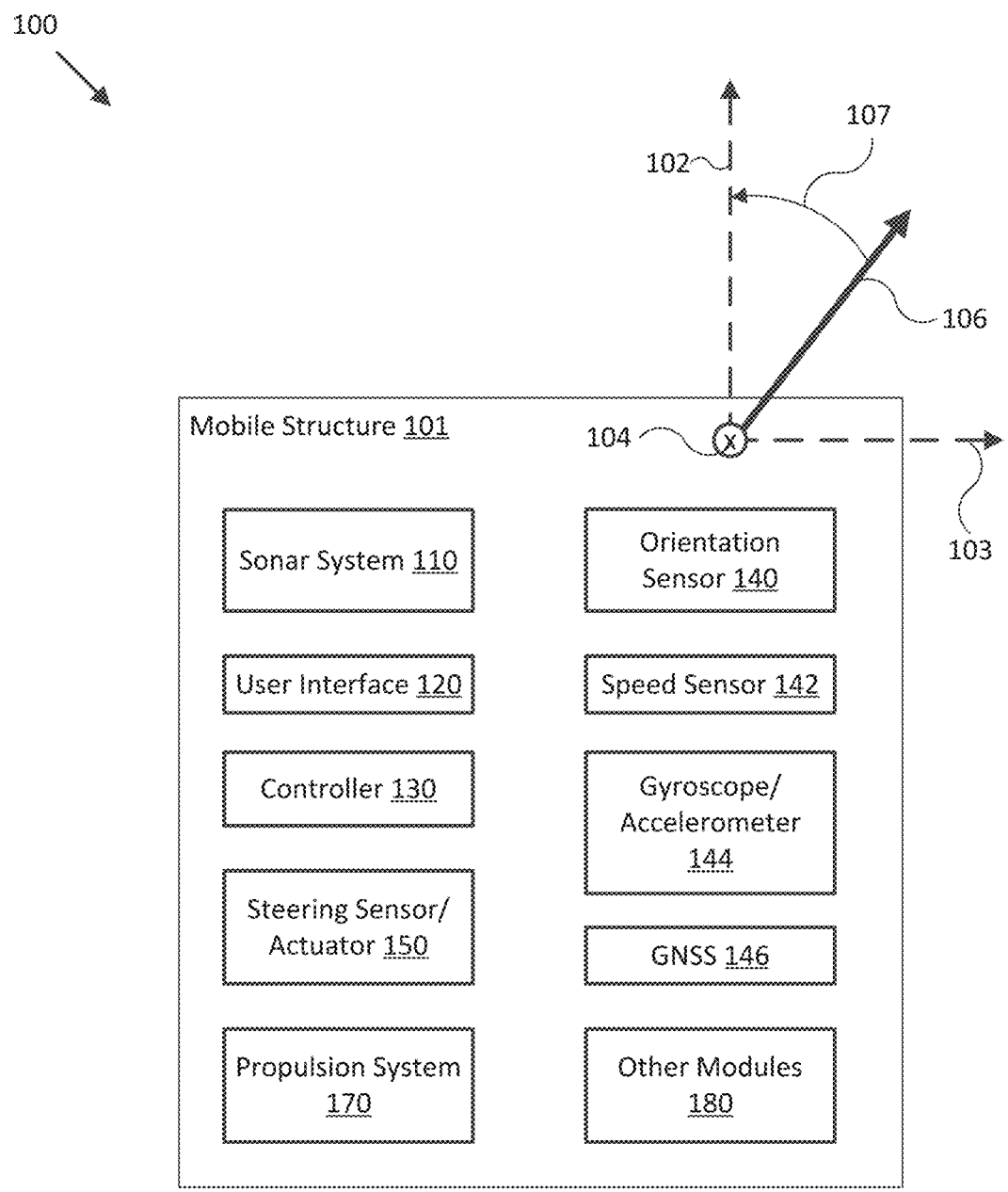
FIG. 1A illustrates a block diagram of a sonar system in accordance with an embodiment of the disclosure.

In accordance with various embodiments of the present disclosure, sonar image data control systems and methods may advantageously include a controller, a user interface, and one or more sonar transducer modules generating multiple different types and/or views of sonar image data, in conjunction with an orientation sensor, a gyroscope, an accelerometer, a position sensor, and/or a speed sensor providing measurements of an orientation, a position, an acceleration, and/or a speed of the sonar transducer modules, associated sonar transducer assemblies, and/or a coupled mobile structure. For example, the sensors may be mounted to or within the mobile structure (e.g., a watercraft, aircraft, motor vehicle, and/or other mobile structure), or may be integrated with the multichannel sonar transducer assemblies and/or the controller.

Sonar systems can acquire more sonar image data than can fit on the screen of a typical display. Users benefit from the ability to "rewind" the display views of the sonar image data back through the recorded sonar image data to return to an area or point of interest (e.g., a temporal and/or spatial area). Such interesting areas may correspond to features detectable by sonar systems, such as depth transitions, bathymetric structures, water column features (e.g., fish and/or submerged hazards), temperature differentials, and/or other detectable features, for example, and/or to user-defined waypoints.

Conventional user interfaces used to control the display of sonar image data derived from multiple different types of sonar transducer modules (e.g., multichannel transducer modules, single or dual channel side view/facing transducer modules, and/or down view/facing transducer modules) and/or according to different display view methodologies are typically visually cluttered with multiple display view controllers and/or preview panes attached to each window/display view of sonar image data, and a user can become confused as to how the views relate to one another as a result. Conventional user interfaces also do not offer an easy way to return to display views corresponding to particular view times at areas/points of interest (e.g., temporal and/or spatial points of interest).

Moreover, geo-referenced and/or three dimensional (3D) sonar image data (e.g., generated by multichannel transducer modules), where each "ping" is rendered as a geo-referenced 3D landscape, the connection to a linear recorded buffer can be less clear, particularly if the sonar image data corresponds to movement along a winding path. Such 3D sonar image data typically does not correlate visually with traditional two dimensional (2D) linear trace sonar image data and/or the typical evolution of time. For example, a time series of overlapping 3D snapshots of the environment may be captured, but the evolution of the aggregation of the 3D snapshots over time (e.g., by averaging, overlapping, and/or other 3D image aggregation) does not easily visually link to the evolution of time and/or traditional 2D sonar image data.

Embodiments of the present disclosure can reliably produce higher quality imagery and be easier to use than conventional systems and/or methods through use of a single common historical view selector that can control the view time for all the different sonar image data types/views currently being displayed to the user (e.g., can provide a means for easily "rewinding" the sonar recordings as displayed by multiple different sonar image data views/windows, regardless of their on-screen arrangement). Moreover, embodiments of the historical view selector may be rendered with various types of view time and/or feature indicators to help a user quickly and accurately select and return to a desired view time (e.g., to the points of interest mentioned above), and cross-reference the multiple sonar image data sources/views at the same point in the recorded history, as described more fully herein.

FIG. 1A illustrates a block diagram of system 100 in accordance with an embodiment of the disclosure. In various embodiments, system 100 may be adapted to measure an orientation, a position, an acceleration, and a speed of mobile structure 101 and/or sonar system 110. System 100 may then use these measurements to form various views of sonar data provided by sonar system 110 and/or to adjust an orientation of sonar system 110 according to a desired operation of sonar system 110 and/or mobile structure 101. In some embodiments, system 100 may display resulting sonar data and/or imagery to a user through user interface 120, and/or use the sonar data and/or imagery to control operation of mobile structure 101, such as controlling steering actuator 150 and/or propulsion system 170 to steer mobile structure 101 according to a desired heading, such as heading angle 107, for example.

In the embodiment shown in FIG. 1A, system 100 may be implemented to provide sonar data and/or imagery for a particular type of mobile structure 101, such as a drone, a watercraft, an aircraft, a robot, a vehicle, and/or other types of mobile structures. In one embodiment, system 100 may include one or more of a sonar system 110, a user interface 120, a controller 130, an orientation sensor 140, a speed sensor 142, a gyroscope/accelerometer 144, a global navigation satellite system (GNSS) 146, a steering sensor/actuator 150, a propulsion system 170, and one or more other sensors and/or actuators, such as other modules 180. In some embodiments, one or more of the elements of system 100 may be implemented in a combined housing or structure that can be coupled to mobile structure 101 and/or held or carried by a user of mobile structure 101.

Directions 102, 103, and 104 describe one possible coordinate frame of mobile structure 101 (e.g., for headings or orientations measured by orientation sensor 140 and/or angular velocities and accelerations measured by gyroscope 144 and accelerometer 145). As shown in FIG. 1A, direction 102 illustrates a direction that may be substantially parallel to and/or aligned with a longitudinal axis of mobile structure 101, direction 103 illustrates a direction that may be substantially parallel to and/or aligned with a lateral axis of mobile structure 101, and direction 104 illustrates a direction that may be substantially parallel to and/or aligned with a vertical axis of mobile structure 101, as described herein. For example, a roll component of motion of mobile structure 101 may correspond to rotations around direction 102, a pitch component may correspond to rotations around direction 103, and a yaw component may correspond to rotations around direction 104.

Heading angle 107 may correspond to the angle between a projection of a reference direction 106 (e.g., the local component of the Earth's magnetic field) onto a horizontal plane (e.g., referenced to a gravitationally defined "down" vector local to mobile structure 101) and a projection of direction 102 onto the same horizontal plane. In some embodiments, the projection of reference direction 106 onto a horizontal plane (e.g., referenced to a gravitationally defined "down" vector) may be referred to as Magnetic North. In various embodiments, Magnetic North, a "down" vector, and/or various other directions, positions, and/or fixed or relative reference frames may define an absolute coordinate frame, for example, where directional measurements referenced to an absolute coordinate frame may be referred to as absolute directional measurements (e.g., an "absolute" orientation). In some embodiments, directional measurements may initially be referenced to a coordinate frame of a particular sensor (e.g., a sonar transducer assembly or module of sonar system 110) and be transformed (e.g., using parameters for one or more coordinate frame transformations) to be referenced to an absolute coordinate frame and/or a coordinate frame of mobile structure 101. In various embodiments, an absolute coordinate frame may be defined and/or correspond to a coordinate frame with one or more undefined axes, such as a horizontal plane local to mobile structure 101 referenced to a local gravitational vector but with an unreferenced and/or undefined yaw reference (e.g., no reference to Magnetic North).

Sonar system 110 may be implemented as one or more electrically and/or mechanically coupled controllers, transmitters, receivers, transceivers, signal processing logic devices, various electrical components, transducer elements of various shapes and sizes, multichannel transducers/transducer modules, transducer assemblies, assembly brackets, transom brackets, and/or various actuators adapted to adjust orientations of any of the components of sonar system 110, as described herein. Sonar system 110 may be configured to emit one, multiple, or a series of acoustic beams, receive corresponding acoustic returns, and convert the acoustic returns into sonar data and/or imagery, such as bathymetric data, water depth, water temperature, water column/volume debris, bottom profile, and/or other types of sonar data. Sonar system 110 may be configured to provide such data and/or imagery to user interface 120 for display to a user, for example, or to controller 130 for additional processing, as described herein.

In some embodiments, sonar system 110 may be implemented using a compact design, where multiple sonar transducers, sensors, and/or associated processing devices are located within a single transducer assembly housing that is configured to interface with the rest of system 100 through a single cable providing both power and communications to and from sonar system 110. In some embodiments, sonar system 110 may include orientation and/or position sensors configured to help provide two or three dimensional waypoints, increase sonar data and/or imagery quality, and/or provide highly accurate bathymetry data, as described herein.

For example, in the context of sea based sonar, fisherman desire highly detailed and accurate information and/or imagery of underwater structure and mid water targets (e.g., fish). Conventional sonar systems are relatively expensive and bulky and typically cannot be used to provide enhanced underwater views, as described herein. Embodiments of sonar system 110 provide a low cost multichannel sonar system that can be configured to produce detailed two and three dimensional sonar data and/or imagery. In some embodiments, sonar system 110 may consolidate electronics and transducers into a single waterproof package to reduce size and costs, for example, and may be implemented with a single connection to other devices of system 100 (e.g., via an Ethernet cable with power over Ethernet, an integral power cable, and/or other communication and/or power transmission conduits integrated into a single interface cable).

In various embodiments, sonar system 110 may be configured to provide many different display views from a variety of selectable perspectives, including down imaging, side imaging, and/or three dimensional imaging, all using the same hardware but with different selectable configurations and/or processing methods, as described herein. In some embodiments, sonar system 110 may be implemented with a single transducer assembly housing incorporating a multichannel transducer and associated electronics. Such embodiments can reduce overall system cost because, for example, a multi-way interface cable is not needed. Such embodiments may also provide improved image quality by locating transmission and receiver electronics close to their corresponding transmission and receive channels, which can drastically improve signal to noise relative to systems that transmit and/or receive analog signals over long cabling.

In general, embodiments of sonar system 110 may be configured to transmit relatively wide fan-shaped acoustic beams using a single transmission channel and/or element of a multichannel transducer, receive similarly shaped acoustic returns using multiple receive channels and/or elements of the multichannel transducer, and to perform beamforming and/or interferometry processing on the acoustic returns to produce high quality two and/or three dimensional sonar imagery, as described herein. In some embodiments, one or more sonar transmitters of sonar system 110 may be configured to use chirp signals to improve range resolution and hence reduce ambiguities typically inherent in interferometry processing techniques.

In some embodiments, sonar system 110 may be implemented with optional orientation and/or position sensors (e.g., similar to orientation sensor 140, gyroscope/accelerometer 144, and/or GNSS 146) that may be incorporated within the transducer assembly housing to provide three dimensional orientations and/or positions of the transducer assembly and/or multichannel transducer for use when processing or post processing sonar data for display. The sensor information can be used to correct for movement of the transducer assembly between ensonifications to provide improved alignment of corresponding acoustic returns/samples, for example, and/or to generate imagery based on the measured orientations and/or positions of the transducer assembly. In other embodiments, an external orientation and/or position sensor can be used alone or in combination with an integrated sensor or sensors.

In embodiments where sonar system 110 is implemented with a position sensor, sonar system 110 may be configured to provide a variety of sonar data and/or imagery enhancements. For example, sonar system 110 may be configured to provide accurate positioning of waypoints remote from mobile system 101 without having to estimate positions using, for example, water depth and range. Similarly, sonar system 110 may be configured to provide accurate two and/or three dimensional display of a series of sonar data; without position data, a sonar system typically assumes a straight track, which can cause image artifacts and/or other inaccuracies in corresponding sonar data and/or imagery. Additionally, when implemented with a position sensor and/or interfaced with a remote but relatively fixed position sensor (e.g., GNSS 146), sonar system 110 may be configured to generate accurate and detailed bathymetric views of a water bed or floor.

In embodiments where sonar system is implemented with an orientation and/or position sensor, sonar system 110 may be configured to store such location/position information along with other sensor information (acoustic returns, temperature measurements, text descriptions, water depth, altitude, mobile structure speed, and/or other sensor and/or control information) available to system 100. In some embodiments, controller 130 may be configured to generate a look up table so that a user can select desired configurations of sonar system 110 for a particular location or to coordinate with some other sensor information. Alternatively, an automated adjustment algorithm can be used to select optimum configurations based on the sensor information.

For example, in one embodiment, mobile structure 101 may be located in an area identified on an chart using position data, a user may have selected a user setting for a configuration of sonar system 110, and controller 130 may be configured to control an actuator and/or otherwise implement the configuration for sonar system 110 (e.g., to set a particular orientation). In another embodiment, controller 130 may be configured to determine water depth and/or altitude, and use such data to control an orientation of sonar system 110 to maintain an optimum orientation for the reported depths/altitudes. In yet another embodiment, a user may be searching for fish in a wide area and may select a configuration setting that will adjust a transducer assembly configuration to ensonify a relatively broad, shallow area. In still another embodiment, controller 130 may be configured to receive orientation measurements for mobile structure 101. In such embodiment, controller 130 may be configured to control the actuators associated with the transducer assembly to maintain its orientation relative to, for example, the water surface, and thus improve the displayed sonar images (e.g., by ensuring consistently oriented acoustic beams and/or proper registration of a series of acoustic returns). In various embodiments, controller 130 may be configured to control steering sensor/actuator 150 and/or propulsion system 170 to adjust a position and/or orientation of mobile structure 101 to help ensure proper registration of a series of acoustic returns, sonar data, and/or sonar imagery.

Although FIG. 1A shows various sensors and/or other components of system 100 separate from sonar system 110, in other embodiments, any one or combination of sensors and components of system 100 may be integrated with a sonar assembly, an actuator, a transducer module, and/or other components of sonar system 110. For example, orientation sensor 140 may be integrated with a transducer module of sonar system 110 and be configured to provide measurements of an absolute and/or relative orientation (e.g., a roll, pitch, and/or yaw) of the transducer module to controller 130 and/or user interface 120, both of which may also be integrated with sonar system 110.

User interface 120 may be implemented as a display, a touch screen, a keyboard, a mouse, a joystick, a knob, a steering wheel, a ship's wheel or helm, a yoke, and/or any other device capable of accepting user input and/or providing feedback to a user. In various embodiments, user interface 120 may be adapted to provide user input (e.g., as a type of signal and/or sensor information) to other devices of system 100, such as controller 130. User interface 120 may also be implemented with one or more logic devices that may be adapted to execute instructions, such as software instructions, implementing any of the various processes and/or methods described herein. For example, user interface 120 may be adapted to form communication links, transmit and/or receive communications (e.g., sensor signals, control signals, sensor information, user input, and/or other information), determine various coordinate frames and/or orientations, determine parameters for one or more coordinate frame transformations, and/or perform coordinate frame transformations, for example, or to perform various other processes and/or methods.

In various embodiments, user interface 120 may be adapted to accept user input, for example, to form a communication link, to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, to adjust a position and/or orientation of an articulated sensor, to select a display view of sonar data for display to a user, and/or to otherwise facilitate operation of system 100 and devices within system 100. Once user interface 120 accepts a user input, the user input may be transmitted to other devices of system 100 over one or more communication links.

In one embodiment, user interface 120 may be adapted to receive a sensor or control signal (e.g., from orientation sensor 140 and/or steering sensor/actuator 150) over communication links formed by one or more associated logic devices, for example, and display sensor and/or other information corresponding to the received sensor or control signal to a user. In related embodiments, user interface 120 may be adapted to process sensor and/or control signals to determine sensor and/or other information. For example, a sensor signal may include an orientation, an angular velocity, an acceleration, a speed, and/or a position of mobile structure 101. In such embodiment, user interface 120 may be adapted to process the sensor signals to determine sensor information indicating an estimated and/or absolute roll, pitch, and/or yaw (attitude and/or rate), and/or a position or series of positions of mobile structure 101, for example, and display the sensor information as feedback to a user. In one embodiment, user interface 120 may be adapted to display a time series of various sensor information and/or other parameters as part of or overlaid on a graph or map, which may be referenced to a position and/or orientation of mobile structure 101. For example, user interface 120 may be adapted to display a time series of positions, headings, and/or orientations of mobile structure 101 and/or other elements of system 100 (e.g., a transducer assembly and/or module of sonar system 110) overlaid on a geographical map, which may include one or more graphs indicating a corresponding time series of actuator control signals, sensor information, and/or other sensor and/or control signals.

In some embodiments, user interface 120 may be adapted to accept user input including a user-defined target heading, route, and/or orientation for a transducer module, for example, and to generate control signals for steering sensor/actuator 150 and/or propulsion system 170 to cause mobile structure 101 to move according to the target heading, route, and/or orientation. In further embodiments, user interface 120 may be adapted to accept user input including a user-defined target attitude for an actuated device (e.g., sonar system 110) coupled to mobile structure 101, for example, and to generate control signals for adjusting an orientation of the actuated device according to the target attitude. More generally, user interface 120 may be adapted to display sensor information to a user, for example, and/or to transmit sensor information and/or user input to other user interfaces, sensors, or controllers of system 100, for instance, for display and/or further processing.

Controller 130 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of sonar system 110, steering sensor/actuator 150, mobile structure 101, and/or system 100, for example. Such software instructions may also implement methods for processing sensor signals, determining sensor information, providing user feedback (e.g., through user interface 120), querying devices for operational parameters, selecting operational parameters for devices, or performing any of the various operations described herein (e.g., operations performed by logic devices of various devices of system 100).

In addition, a machine readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store sensor signals, sensor information, parameters for coordinate frame transformations, calibration parameters, sets of calibration points, and/or other operational parameters, over time, for example, and provide such stored data to a user using user interface 120. In some embodiments, controller 130 may be integrated with one or more user interfaces (e.g., user interface 120), and, in one embodiment, may share a communication module or modules. As noted herein, controller 130 may be adapted to execute one or more control loops for actuated device control, steering control (e.g., using steering sensor/actuator 150) and/or performing other various operations of mobile structure 101 and/or system 100. In some embodiments, a control loop may include processing sensor signals and/or sensor information in order to control one or more operations of sonar system 110, mobile structure 101, and/or system 100.

Orientation sensor 140 may be implemented as one or more of a compass, float, accelerometer, and/or other device capable of measuring an orientation of mobile structure 101 (e.g., magnitude and direction of roll, pitch, and/or yaw, relative to one or more reference orientations such as gravity and/or Magnetic North) and providing such measurements as sensor signals that may be communicated to various devices of system 100. In some embodiments, orientation sensor 140 may be adapted to provide heading measurements for mobile structure 101. In other embodiments, orientation sensor 140 may be adapted to provide roll, pitch, and/or yaw rates for mobile structure 101 (e.g., using a time series of orientation measurements). Orientation sensor 140 may be positioned and/or adapted to make orientation measurements in relation to a particular coordinate frame of mobile structure 101, for example.

Speed sensor 142 may be implemented as an electronic pitot tube, metered gear or wheel, water speed sensor, wind speed sensor, a wind velocity sensor (e.g., direction and magnitude) and/or other device capable of measuring or determining a linear speed of mobile structure 101 (e.g., in a surrounding medium and/or aligned with a longitudinal axis of mobile structure 101) and providing such measurements as sensor signals that may be communicated to various devices of system 100. In some embodiments, speed sensor 142 may be adapted to provide a velocity of a surrounding medium relative to sensor 142 and/or mobile structure 101.

Gyroscope/accelerometer 144 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile structure 101 and providing such measurements as sensor signals that may be communicated to other devices of system 100 (e.g., user interface 120, controller 130). Gyroscope/accelerometer 144 may be positioned and/or adapted to make such measurements in relation to a particular coordinate frame of mobile structure 101, for example. In various embodiments, gyroscope/accelerometer 144 may be implemented in a common housing and/or module to ensure a common reference frame or a known transformation between reference frames.

GNSS 146 may be implemented as a global navigation satellite system receiver (e.g., a GPS receiver) and/or other device capable of determining absolute and/or relative position of mobile structure 101 based on wireless signals received from space-born and/or terrestrial sources, for example, and capable of providing such measurements as sensor signals that may be communicated to various devices of system 100. In some embodiments, GNSS 146 may be adapted to determine a velocity, speed, and/or yaw rate of mobile structure 101 (e.g., using a time series of position measurements), such as an absolute velocity and/or a yaw component of an angular velocity of mobile structure 101. In various embodiments, one or more logic devices of system 100 may be adapted to determine a calculated speed of mobile structure 101 and/or a computed yaw component of the angular velocity from such sensor information.

Steering sensor/actuator 150 may be adapted to physically adjust a heading of mobile structure 101 according to one or more control signals, user inputs, and/or a stabilized attitude estimates provided by logic device of system 100, such as controller 130. Steering sensor/actuator 150 may include one or more actuators and control surfaces (e.g., a rudder or other type of steering mechanism) of mobile structure 101, and may be adapted to physically adjust the control surfaces to a variety of positive and/or negative steering angles/positions.

Propulsion system 170 may be implemented as a propeller, turbine, or other thrust-based propulsion system, a mechanical wheeled and/or tracked propulsion system, a sail-based propulsion system, and/or other types of propulsion systems that can be used to provide motive force to mobile structure 101. In some embodiments, propulsion system 170 may be non-articulated, for example, such that the direction of motive force and/or thrust generated by propulsion system 170 is fixed relative to a coordinate frame of mobile structure 101. Non-limiting examples of non-articulated propulsion systems include, for example, an inboard motor for a watercraft with a fixed thrust vector, for example, or a fixed aircraft propeller or turbine. In other embodiments, propulsion system 170 may be articulated, for example, and may be coupled to and/or integrated with steering sensor/actuator 150, for example, such that the direction of generated motive force and/or thrust is variable relative to a coordinate frame of mobile structure 101. Non-limiting examples of articulated propulsion systems include, for example, an outboard motor for a watercraft, an inboard motor for a watercraft with a variable thrust vector/port (e.g., used to steer the watercraft), a sail, or an aircraft propeller or turbine with a variable thrust vector, for example.

Other modules 180 may include other and/or additional sensors, actuators, communications modules/nodes, and/or user interface devices used to provide additional environmental information of mobile structure 101, for example. In some embodiments, other modules 180 may include a humidity sensor, a wind and/or water temperature sensor, a barometer, a radar system, a visible spectrum camera, an infrared camera, and/or other environmental sensors providing measurements and/or other sensor signals that can be displayed to a user and/or used by other devices of system 100 (e.g., controller 130) to provide operational control of mobile structure 101 and/or system 100 that compensates for environmental conditions, such as wind speed and/or direction, swell speed, amplitude, and/or direction, and/or an object in a path of mobile structure 101, for example. In some embodiments, other modules 180 may include one or more actuated devices (e.g., spotlights, cameras, radars, sonars, and/or other actuated devices) coupled to mobile structure 101, where each actuated device includes one or more actuators adapted to adjust an orientation of the device, relative to mobile structure 101, in response to one or more control signals (e.g., provided by controller 130).

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sonar data and/or imagery, for example, or for transmitting and/or receiving communications, such as sensor signals, sensor information, and/or control signals, between one or more devices of system 100. In one embodiment, such method may include instructions to receive an orientation, acceleration, position, and/or speed of mobile structure 101 and/or sonar system 110 from various sensors, to determine a transducer orientation adjustment (e.g., relative to a desired transducer orientation) from the sensor signals, and/or to control an actuator to adjust a transducer orientation accordingly, for example, as described herein. In a further embodiment, such method may include instructions for forming one or more communication links between various devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Each of the elements of system 100 may be implemented with one or more amplifiers, modulators, phase adjusters, beamforming components, digital to analog converters (DACs), analog to digital converters (ADCs), various interfaces, antennas, transducers, and/or other analog and/or digital components enabling each of the devices of system 100 to transmit and/or receive signals, for example, in order to facilitate wired and/or wireless communications between one or more devices of system 100. Such components may be integrated with a corresponding element of system 100, for example. In some embodiments, the same or similar components may be used to perform one or more sensor measurements, as described herein. For example, the same or similar components may be used to create an acoustic pulse (e.g., a transmission control signal and/or a digital shaping control signal), convert the acoustic pulse to an excitation signal (e.g., a shaped or unshaped transmission signal) and transmit it to a sonar transducer element to produce an acoustic beam, receive an acoustic return (e.g., a sound wave received by the sonar transducer element and/or corresponding electrical signals from the sonar transducer element), convert the acoustic return to acoustic return data, and/or store sensor information, configuration data, and/or other data corresponding to operation of a sonar system, as described herein. Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques.

In some embodiments, various elements or portions of elements of system 100 may be integrated with each other, for example, or may be integrated onto a single printed circuit board (PCB) to reduce system complexity, manufacturing costs, power requirements, and/or timing errors between the various sensor measurements. For example, gyroscope/accelerometer 144 and controller 130 may be configured to share one or more components, such as a memory, a logic device, a communications module, and/or other components, and such sharing may act to reduce and/or substantially eliminate such timing errors while reducing overall system complexity and/or cost.

Each element of system 100 may include one or more batteries or other electrical power storage devices, for example, and may include one or more solar cells or other electrical power generating devices (e.g., a wind or water-powered turbine, or a generator producing electrical power from motion of one or more elements of system 100). In some embodiments, one or more of the devices may be powered by a power source for mobile structure 101, using one or more power leads. Such power leads may also be used to support one or more communication techniques between elements of system 100.

In various embodiments, a logic device of system 100 (e.g., of orientation sensor 140 and/or other elements of system 100) may be adapted to determine parameters (e.g., using signals from various devices of system 100) for transforming a coordinate frame of sonar system 110 and/or other sensors of system 100 to/from a coordinate frame of mobile structure 101, at-rest and/or in-motion, and/or other coordinate frames, as described herein. One or more logic devices of system 100 may be adapted to use such parameters to transform a coordinate frame of sonar system 110 and/or other sensors of system 100 to/from a coordinate frame of orientation sensor 140 and/or mobile structure 101, for example. Furthermore, such parameters may be used to determine and/or calculate one or more adjustments to an orientation of sonar system 110 that would be necessary to physically align a coordinate frame of sonar system 110 with a coordinate frame of orientation sensor 140 and/or mobile structure 101, for example, or an absolute coordinate frame. Adjustments determined from such parameters may be used to selectively power adjustment servos/actuators (e.g., of sonar system 110 and/or other sensors or elements of system 100), for example, or may be communicated to a user through user interface 120, as described herein.

Figure 1B:
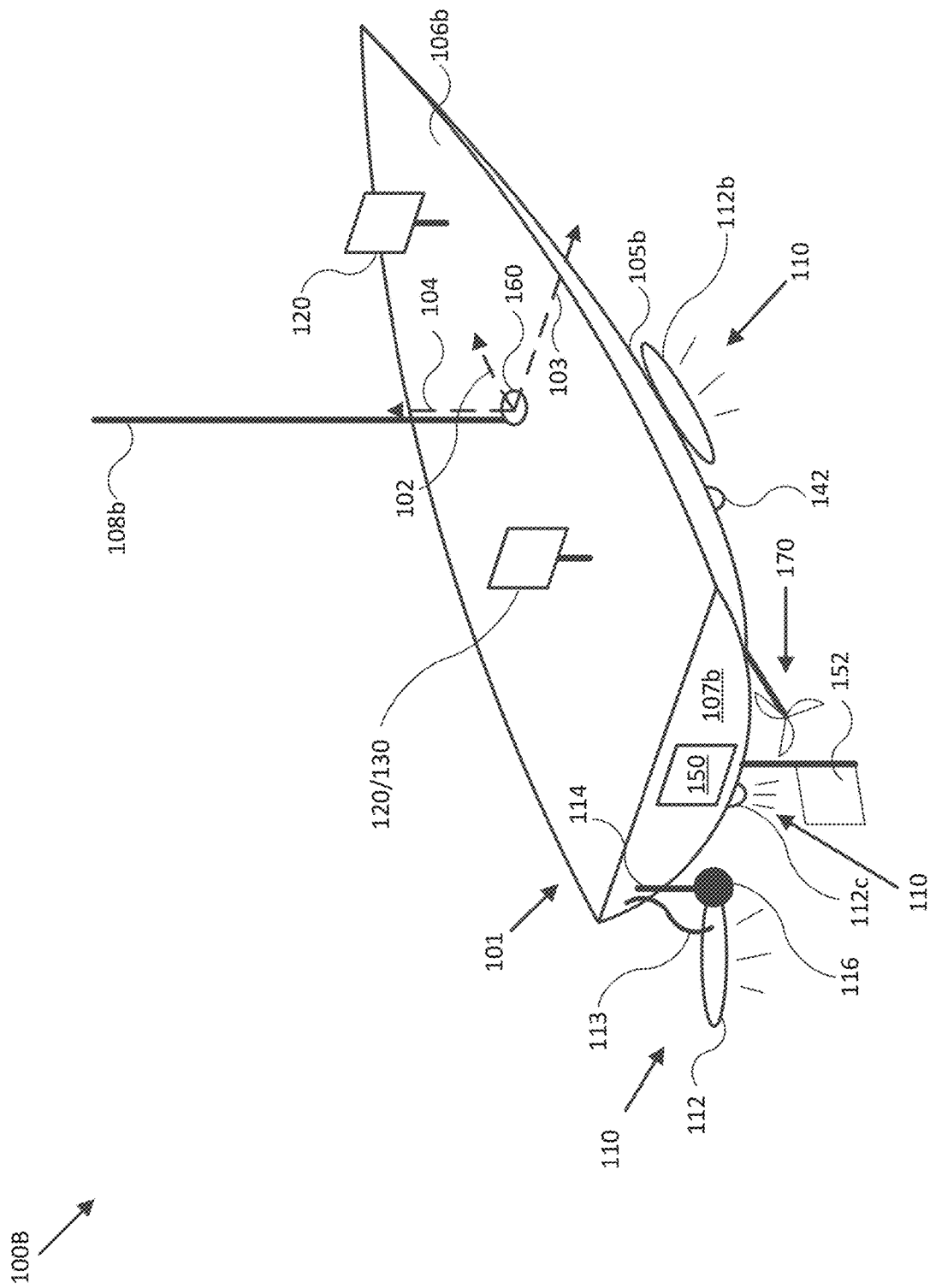
FIG. 1B illustrates a diagram of a sonar system in accordance with an embodiment of the disclosure.

FIG. 1B illustrates a diagram of system 100B in accordance with an embodiment of the disclosure. In the embodiment shown in FIG. 1B, system 100B may be implemented to provide sonar data and/or imagery for use with operation of mobile structure 101, similar to system 100 of FIG. 1B. For example, system 100B may include sonar system 110, integrated user interface/controller 120/130, secondary user interface 120, steering sensor/actuator 150, sensor cluster 160 (e.g., orientation sensor 140, gyroscope/accelerometer 144, and/or GNSS 146), and various other sensors and/or actuators. In the embodiment illustrated by FIG. 1B, mobile structure 101 is implemented as a motorized boat including a hull 105b, a deck 106b, a transom 107b, a mast/sensor mount 108b, a rudder 152, an inboard motor 170, and an actuated sonar transducer assembly 112 coupled to transom 107b, a sonar transducer assembly 112b mounted to hull 105b, and a sonar transducer assembly 112c mounted to hull 105b roughly proximate to transom 107b and/or a keel of mobile structure 101. In other embodiments, hull 105b, deck 106b, mast/sensor mount 108b, rudder 152, inboard motor 170, and various actuated devices may correspond to attributes of a passenger aircraft or other type of vehicle, robot, or drone, for example, such as an undercarriage, a passenger compartment, an engine/engine compartment, a trunk, a roof, a steering mechanism, a headlight, a radar system, and/or other portions of a vehicle.

As depicted in FIG. 1B, mobile structure 101 includes sonar system 110, which in turn includes actuated sonar transducer assembly 112 coupled to transom 107b of mobile structure 101 through assembly bracket/actuator 116 and transom bracket 114, sonar transducer assembly 112b coupled directly to hull 105b, and sonar transducer assembly 112c coupled directly to hull 105b, as shown. Each of sonar transducer assemblies 112, 112b, and 112c are configured to communicate with user interface/controller 120/130 and/or receive power from mobile structure 101 over one or more cables/Ethernet connections, though only Ethernet connection/cable 113 is explicitly shown in FIG. 1B.

In some embodiments, assembly bracket/actuator 116 may be implemented as a roll, pitch, and/or yaw actuator, for example, and may be adapted to adjust an orientation of sonar transducer assembly 112 according to control signals and/or an orientation (e.g., roll, pitch, and/or yaw) or position of mobile structure 101 provided by user interface/controller 120/130. For example, user interface/controller 120/130 may be adapted to receive an orientation of sonar transducer assembly 112 configured to ensonify a portion of surrounding water and/or a direction referenced to an absolute coordinate frame, and to adjust an orientation of sonar transducer assembly 112 to retain ensonification of the position and/or direction in response to motion of mobile structure 101, using one or more orientations and/or positions of mobile structure 101 and/or other sensor information derived by executing various methods described herein.

In another embodiment, user interface/controller 120/130 may be configured to adjust an orientation of sonar transducer assembly 112 to direct sonar transmissions from sonar transducer assembly 112 substantially downwards and/or along an underwater track during motion of mobile structure 101. In such embodiment, the underwater track may be predetermined, for example, or may be determined based on criteria parameters, such as a minimum allowable depth, a maximum ensonified depth, a bathymetric route, and/or other criteria parameters. In a further embodiment, interface/controller 120/130 may be configured to schedule ensonifications of sonar transducer assemblies 112, 112b, and/or 112c to reduce cross interference, for example, or to eliminate registration errors caused by movement of mobile structure 101 (e.g., to synchronize ensonifications with particular motions or orientations of mobile structure 101 or any of sonar transducer assemblies 112/112b/112c.

In various embodiments, each of sonar transducer assemblies 112/112b/112c may be implemented with different types and/or arrangements of transducer modules, for example, such as a multichannel transducer module (e.g., disposed within sonar transducer assembly 112), a side view transducer module (e.g., one or more linear transducer elements disposed within sonar transducer assembly 112b), a down view transducer module (e.g., one or more linear or circular transducer elements disposed within sonar transducer assembly 112c), and/or other types of transducer modules. In some embodiments, multiple types of transducer modules may be housed within a single sonar transducer assembly, as described herein. Sonar image data derived from acoustic returns received by each corresponding transducer module may be rendered in separate windows or graphical areas on a display of user interfaces 120.

In one embodiment, user interfaces 120 may be mounted to mobile structure 101 substantially on deck 106b and/or mast/sensor mount 108b. Such mounts may be fixed, for example, or may include gimbals and other leveling mechanisms/actuators so that a display of user interfaces 120 stays substantially level with respect to a horizon and/or a "down" vector (e.g., to mimic typical user head motion/orientation). In another embodiment, at least one of user interfaces 120 may be located in proximity to mobile structure 101 and be mobile throughout a user level (e.g., deck 106b) of mobile structure 101. For example, secondary user interface 120 may be implemented with a lanyard and/or other type of strap and/or attachment device and be physically coupled to a user of mobile structure 101 so as to be in proximity to mobile structure 101. In various embodiments, user interfaces 120 may be implemented with a relatively thin display that is integrated into a PCB of the corresponding user interface in order to reduce size, weight, housing complexity, and/or manufacturing costs.

As shown in FIG. 1B, in some embodiments, speed sensor 142 may be mounted to a portion of mobile structure 101, such as to hull 105b, and be adapted to measure a relative water speed. In some embodiments, speed sensor 142 (and/or sonar transducer assemblies 112/112b/112c) may be adapted to provide a thin profile to reduce and/or avoid water or air drag. In various embodiments, speed sensor 142 may be mounted to a portion of mobile structure 101 that is substantially outside easy operational accessibility. Speed sensor 142 may include one or more batteries and/or other electrical power storage devices, for example, and may include one or more water-powered turbines to generate electrical power. In other embodiments, speed sensor 142 may be powered by a power source for mobile structure 101, for example, using one or more power leads penetrating hull 105b. In alternative embodiments, speed sensor 142 may be implemented as a wind velocity sensor, for example, and may be mounted to mast/sensor mount 108b to have relatively clear access to local wind.

In the embodiment illustrated by FIG. 1B, mobile structure 101 includes direction/longitudinal axis 102, direction/lateral axis 103, and direction/vertical axis 104 meeting approximately at mast/sensor mount 108b (e.g., near a center of gravity of mobile structure 101). In one embodiment, the various axes may define a coordinate frame of mobile structure 101 and/or sensor cluster 160. Each sensor adapted to measure a direction (e.g., velocities, accelerations, headings, or other states including a directional component) may be implemented with a mount, actuators, and/or servos that can be used to align a coordinate frame of the sensor with a coordinate frame of any element of system 100B and/or mobile structure 101. Each element of system 100B may be located at positions different from those depicted in FIG. 1B. Each device of system 100B may include one or more batteries or other electrical power storage devices, for example, and may include one or more solar cells or other electrical power generating devices. In some embodiments, one or more of the devices may be powered by a power source for mobile structure 101. As noted herein, each element of system 100B may be implemented with an antenna, a logic device, and/or other analog and/or digital components enabling that element to provide, receive, and process sensor signals and interface or communicate with one or more devices of system 100B. Further, a logic device of that element may be adapted to perform any of the methods described herein.

Figure 2:
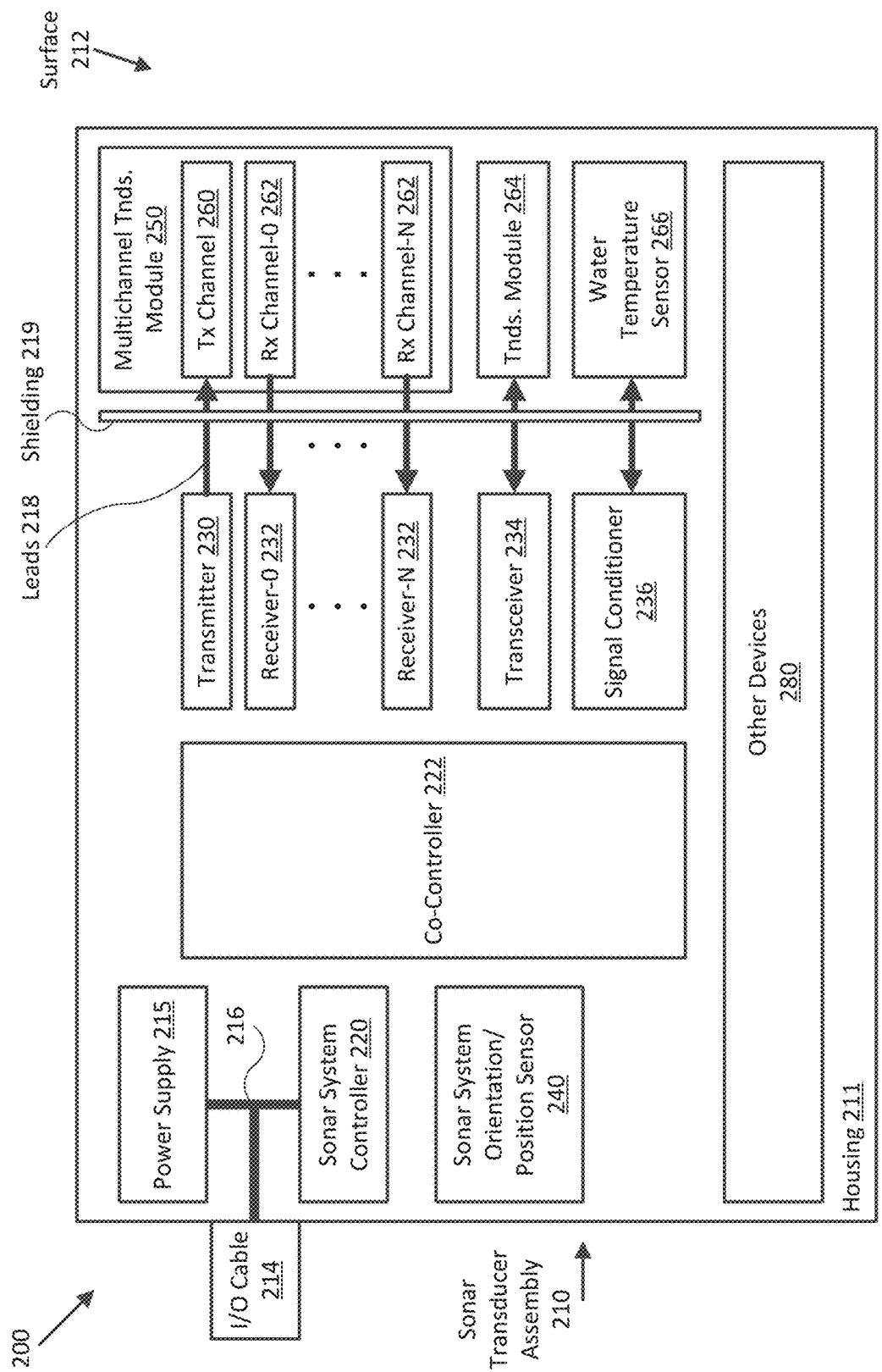
FIG. 2 illustrates a diagram of a sonar system in accordance with an embodiment of the disclosure.

FIG. 2 illustrates a diagram of a sonar system 200 in accordance with an embodiment of the disclosure. In the embodiment shown in FIG. 2, sonar system 200 includes a sonar transducer assembly 210 that can be coupled to a user interface (e.g., user interface 120 of FIG. 1A) and/or a power source through a single I/O cable 214. As shown, sonar transducer assembly 210 may include one or more controllers (e.g., sonar system controller 220 and/or co-controller 222), transducer modules (e.g., multichannel transducer module 250 and/or transducer module 264), other sensors (e.g., orientation/position sensor 240 and/or water temperature sensor 266), and/or other devices facilitating operation of system 200 all disposed within a common housing 211. In other embodiments, one or more of the devices shown in FIG. 2 may be integrated with a remote user interface and communicate with remaining devices within sonar transducer assembly 210 through one or more data and/or power cables similar to I/O cable 214.

Controller 220 and/or co-controller 222 may each be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of sonar transducer assembly 210 and/or system 200, for example, similar to controller 130. In typical embodiments, controller 220 may be tasked with overseeing general operation of sonar transducer assembly 210, generating sonar imagery from sonar data, correlating sensor data with sonar data/imagery, communicating operational parameters and/or sensor information with other devices through I/O cable 214, and/or other non-time-critical operations of system 200. In such embodiments, co-controller 222 may be implemented with relatively high resolution timing circuitry capable of generating digital transmission and/or sampling control signals for operating transmitters, receivers, transceivers, signal conditioners, and/or other devices of sonar transducer assembly 210, for example, and other time critical operations of system 200, such as per-sample digital beamforming and/or interferometry operations applied to sonar returns from multichannel transducer module 250, as described herein. In some embodiments, controller 220 and co-controller 222 may be integrated together, for example, or may be implemented in a distributed manner across a number of individual controllers.

Transmitter 230 may be implemented with one or more digital to analog converters (DACs), signal shaping circuits, filters, phase adjusters, signal conditioning elements, amplifiers, timing circuitry, logic devices, and/or other digital and/or analog electronics configured to accept digital control signals from co-controller 222 and to generate transmission signals to excite a transmission channel/transducer element of multichannel transducer module 250 (e.g., transmission channel 260) to produce one or more acoustic beams. In some embodiments, operation of transmitter 230 (e.g., amplification, frequency dependent filtering, transmit signal frequency, duration, shape, and/or timing/triggering, and/or other signal attributes), may be controlled (e.g., through use of various control signals) by co-controller 222, as described herein.

Each of receivers 232 (e.g., for N channels as shown) may be implemented with one or more analog to digital converters (ADCs), filters, phase adjusters, signal conditioning elements, amplifiers, timing circuitry, logic devices, and/or other digital and/or analog electronics configured to accept analog acoustic returns from a corresponding receive channel/transducer element of multichannel transducer module 250 (e.g., receive channels 262), convert the analog acoustic returns into digital acoustic returns, and provide the digital acoustic returns to co-controller 222. In some embodiments, operation of each receiver 232 (e.g., amplification, frequency dependent filtering, basebanding, sample resolution, duration, and/or timing/triggering, and/or other ADC/signal attributes) may be controlled by co-controller 222. For example, co-controller 222 may be configured to use receivers 232 to convert an acoustic return into a digital acoustic return comprising one or more digital baseband transmissions that are then provided to co-controller 222. In some embodiments, receivers 232 may be configured to low-pass or otherwise filter, amplify, decimate, and/or otherwise process the acoustic and/or digital acoustic returns (e.g., using analog and/or digital signal processing) prior to providing the digital acoustic returns to co-controller 222. In other embodiments, receivers 232 may be configured to provide substantially unprocessed (e.g., raw) analog and/or digital acoustic returns to co-controller 222 for further signal processing, as described herein. In further embodiments, transmitter 230 and one or more of receivers 232 may be integrated into a single transceiver.

In the embodiment shown in FIG. 2, multichannel transducer module 250 includes multiple transducer elements and/or transmission/receive channels that may be operated substantially independently of each other and be configured to emit acoustic beams and receive acoustic returns through emission surface 212 of housing 211. In some embodiments, multichannel transducer module 250 may include a single transmission channel 260 and, separately, multiple receive channels 262. In other embodiments, multichannel transducer module 250 may include multiple transmission channels. In further embodiments, transmission channel 260 may be implemented as both a transmission channel and a receive channel though use of a transceiver (e.g., similar to transceiver 234). In general, transmission channel 260 may be implemented as one, two, or many separate transducer elements configured to produce one or more acoustic beams. Each of receive channels 262 may also be implemented as one, two, or many separate transducer elements, but configured to receive acoustic returns. The effective volumetric shapes of the acoustic beams and acoustic returns may be determined by the shapes and arrangements of their corresponding transducer elements, as described herein. In various embodiments, the various channels of multichannel transducer module 250 may be arranged to facilitate multichannel processing, such as beamforming, interferometry, inter-beam interpolation, and/or other types of multichannel processing used to produce sonar data and/or imagery.

For example, in one embodiment, multichannel transducer module 250 may be implemented with multiple transmission channels 260 arranged in a phased array to allow electronic steering of relatively narrow acoustic beams (relative to those produced by a single transmission channel 260) within a relatively wide range of transmission angles. In such embodiments, sonar transducer assembly 210 may be configured to use such electronically steered beams to improve signal-to-noise in resulting sonar data and/or imagery and/or to improve rejection of false targets detected in the corresponding acoustic returns. A related and less complex embodiment could be a transmission array implemented without phasing such that the resulting acoustic beam width can be adjusted by including or excluding transmission channels and/or elements. For example, such embodiments could be used to alternate between operation with deep verses shallow water where the acoustic beams could be switched between relatively narrow for deep water and relative wide for shallow water.

In some embodiments, sonar transducer assembly 210 may be implemented with one or more additional transducers (e.g., transducer module 264) separate from multichannel transducer module 250, and serviced by separate transmitter/receiver electronics similar to transmitter 230 and/or receivers 232 (e.g., transceiver 234, which may include high voltage protection circuitry and/or transmit/receive switching to enable transmission and reception over the same leads 218). In various embodiments, operation of transceiver 234 and/or transducer module 264 (e.g., and its constituent transducer elements) may be controlled by co-controller 222, similar to control of transmitter 230 and/or receivers 232 described herein. Typically, transceiver 234 and/or transducer module 264 may be configured to produce acoustic beams adapted to reduce or eliminate interference with operation of multichannel transducer module 250, such as by using a substantially different transmission frequency, timing, and/or shape, and/or by aiming the acoustic beams in a substantially non-interfering direction. In alternative embodiments, transceiver 234 and/or transducer module 264 may be configured to generate acoustic beams that produce acoustic returns in multichannel transducer module 250, similar to operation of transmitter 230 and transmission channel 260, but from an oblique angle relative to multichannel transducer module 250. In such embodiments, the oblique acoustic returns may be used to generate sonar imagery with increased spatial differentiation and/or contrast between objects in the water column ensonified by sonar transducer assembly 210.

Sonar transducer assembly 210 may include water temperature sensor 266, which may be a digital and/or analog thermometer, sound cell, and/or other analog or digital device configured to measure a temperature of water near emission surface 212 and provide a corresponding sensor signal to signal conditioner 236 and/or co-controller 222. For example, sound velocity and/or attenuation in water is at least partially dependent on water temperature, and so measured water temperatures may be used to determine accurate measurements of spatial displacements (e.g., depths, object dimensions, and/or other spatial displacements) ensonified by sonar transducer assembly 210. Signal conditioner 236 may be one or more ADCs, filters, signal conditioning elements, amplifiers, timing circuitry, logic devices, and/or other digital and/or analog electronics configured to accept sensor signals from water temperature sensor 266, filter, amplify, linearize, and/or otherwise condition the sensor signals, and provide the conditioned sensor signals to co-controller 222. In some embodiments, signal conditioner 236 may be configured to provide reference signals and/or other control signals to water temperature sensor 266 to enable operation of a particular type of water temperature sensor, for example, and may be controlled by co-controller 222.

In FIG. 2, each of multichannel transducer module 250, transducer 262, and/or water temperature sensor 266 are coupled to their electronics over leads 218 and through shielding 219. In various embodiments, leads 218 and/or shielding 219 may be implemented as one or more shielded transmission lines configured to convey analog and/or digital signals between the various elements while shielding the transducers and/or temperature sensor from electromagnetic interference from each other, other elements of sonar transducer assembly 210, and/or external sources. In some embodiments, leads 218 and shielding 219 may be integrated together to form a transmission system. For example, shielding 219 may be configured to provide a ground plane/return for signals conveyed by leads 218. In one embodiment, leads 218 may be implemented as a first conductive ribbon with multiple electrically isolated conductive traces (e.g., one for each channel/sensor), for example, and shielding 219 may be implemented as a second conductive ribbon with one or more relatively wide conductive traces electrically coupled to multiple channels of multichannel transducer module 250, transducer module 264, and/or water temperature sensor 266.

As shown, sonar transducer assembly 210 may be implemented with sonar system orientation/position sensor 240. Orientation/position sensor 240 may be implemented as one or more orientation sensors, GPS sensors, differential GPS sensors, orientation/position reference transducers and/or optical sensor (e.g., for actuators), and/or other sensors configured to measure a relative and/or absolute orientation and/or position of sonar transducer assembly 210 and/or multichannel transducer module 250 and provide such measurements to controller 220 and/or co-controller 222. In some embodiments, controller 220 and/or co-controller 222 may be configured to combine sonar data and/or imagery according to such measurements and/or measurements of an orientation and/or position of a coupled mobile structure to produce combined sonar data and/or imagery, such as multiple co-registered sonar images, for example, and/or three dimensional sonar images. In other embodiments, controller 220 and/or co-controller 222 may be configured to use orientation and/or position measurements of sonar transducer assembly 210 and/or a coupled mobile structure to control one or more actuators (e.g., other devices 280) to adjust a position and/or orientation of sonar transducer assembly 210 and ensonify a particular position and/or orientation using sonar transducer assembly 210 and/or multichannel transducer module 250.

Other devices 280 may include other and/or additional sensors, sensor arrays, actuators, logic devices, communications modules/nodes, power distribution components, and/or user interface devices used to provide additional environmental information and/or configuration parameters, for example, and/or to adjust a position and/or orientation of sonar transducer assembly 210. In some embodiments, other devices 280 may include a visible spectrum camera, an infrared camera, and/or other environmental sensors providing measurements and/or other sensor signals that can be displayed to a user and/or used by other devices of sonar transducer assembly 210 (e.g., controller 220) to provide operational control of sonar transducer assembly 210. In some embodiments, other devices 280 may include one or more actuators adapted to adjust an orientation (e.g., roll, pitch, and/or yaw) and/or a position (longitudinal, lateral, and/or vertical) of sonar transducer assembly 210, multichannel transducer module 250, and/or transducer module 264, relative to a coupled mobile structure, in response to one or more control signals (e.g., provided by controller 220). In other embodiments, other devices 280 may include one or more brackets, such as a transom bracket, adapted to couple housing 211 to a mobile structure.

In various embodiments, sonar transducer assembly 210 may be implemented in a single housing 211 with a single interface (e.g., I/O cable 214) to simplify installation and use. For example, I/O cable 214 may be implemented as a power-over-Ethernet (POE) cable supporting transmission of both communications and power between sonar transducer assembly 210 and elements of a coupled mobile structure. Such communications and/or power may be delivered over leads 216 to power supply 215 and/or controller 220. Power supply 215 may be implemented as one or more power conditioners, line filters, switching power supplies, DC to DC converters, voltage regulators, power storage devices (e.g., batteries), and/or other power supply devices configured to receive power over leads 216 and/or distribute power to the various other elements of sonar transducer assembly 210.

In various sensor applications, including sonar, radar, and/or other transmission signal-based sensor systems, it is advantageous to be able to control the overall shape of the transmission signal (e.g., a burst of signals). From a processing perspective, shaping the transmission signal can reduce the number and magnitude of artifacts that typically occur along the range direction of the sensor system, which improves the quality and accuracy of resulting imagery and collateral processing, such as reducing false target detection. From a power amplifier design perspective, the shaping can reduce transients and associated issues with component saturation. From an electromagnetic compatibility (EMC) perspective, the shaping can reduce harmonics and associated spurious interference. Switching methods such as pulse width modulation (PWM) or pulse density modulation (PDM) require expensive fast switching components that can introduce unwanted harmonics and otherwise cause degradation in operation of a sensor system.

Figure 3A:
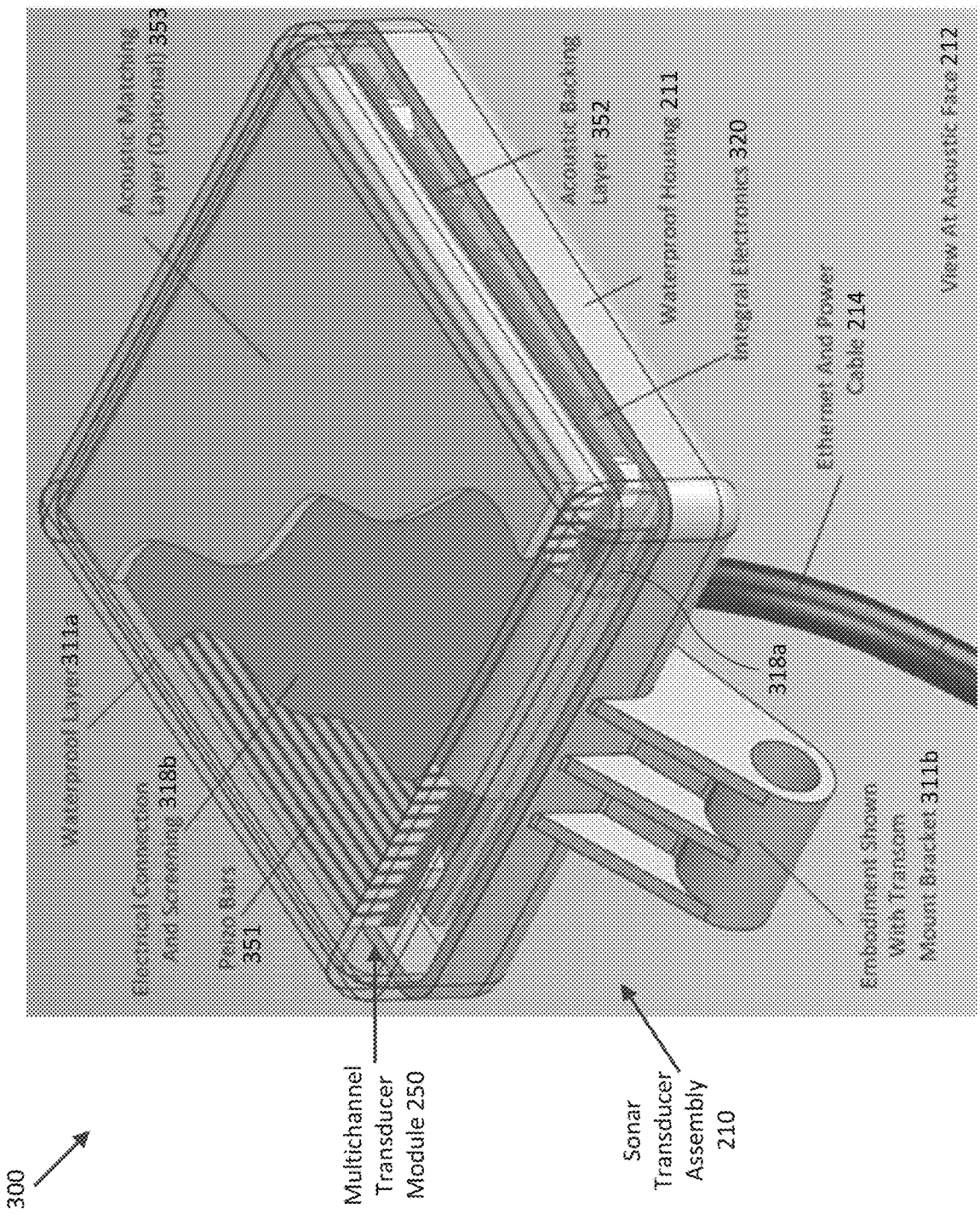
FIGS. 3A-B illustrate diagrams of multichannel sonar systems in accordance with embodiments of the disclosure.
Figure 3B:
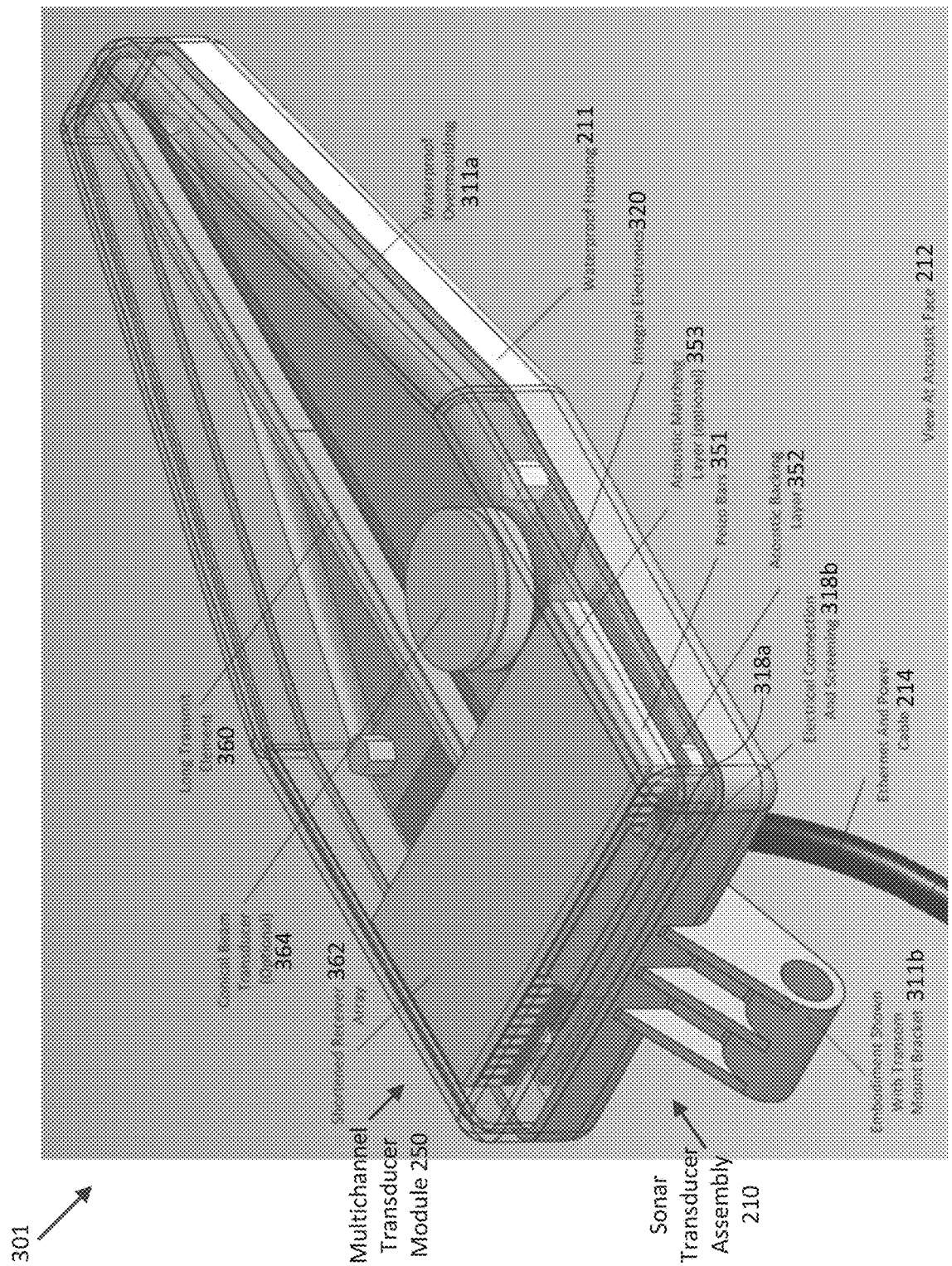

FIGS. 3A-B illustrate diagrams of multichannel sonar systems in accordance with embodiments of the disclosure. In the embodiment illustrated in FIG. 3A, multichannel sonar system 300 includes sonar transducer assembly 210 with multichannel transducer module 250 coupled to additional components (e.g., user interface 120) though cable 214. As shown, in some embodiments, multichannel transducer module 250 may be implemented with multiple longitudinally adjacent linear transducer elements 351 coupled to integral electronics 320 (e.g., transmitters, receivers, transceivers, controllers, and/or other electronics) through conductive ribbons 318a-b. Each transducer element 351 may, in some embodiments, be implemented from a piezoelectric material and/or formed from one or more electrically coupled piezoelectric bars. Conductive ribbon 318a may be implemented with multiple conductive traces (e.g., one per channel), for example, and conductive ribbon 318b may be implemented with a single relatively wide conductive plane that may form a ground plane/current return and help to shield linear transducer elements 351 from external electromagnetic interference. In some embodiments, conductive ribbon 318a may be adapted to shield linear transducer elements 351 from electromagnetic interference from external sources and from integral electronics 320, such as by using relatively wide conductive traces to substantially cover the opposing face of multichannel transducer module 250, for example, and/or by including a separate ground plane trace in addition to the multiple conductive traces coupled to the channels of multichannel transducer module 250.

In typical embodiments, the number of transducer elements 351 equals the number of channels of multichannel transducer module 250. However, in other embodiments, multiple transducer elements 351 may be electrically coupled to form a single channel. For example, in one embodiment, pairs of adjacent transducer elements may be electrically coupled to form a reduced number of channels in order to reduce electronics complexity and cost, form differently shaped acoustic beams and/or return patterns, and/or conform to other produce design specifications. In some embodiments, conductive ribbons 318a-b may be configured to electrically couple multiple transducer elements 351 into a reduced number of channels. In other embodiments, integral electronics 320 (e.g., co-controller 222) may be configured to operate multiple physical channels as a single channel and produce a similar result but without requiring physical changes to integral electronics 320, conductive ribbons 318a-b, and/or multichannel transducer module 250.

As shown in FIG. 3A, multichannel transducer module 250 may be disposed within housing 211 between an optional acoustic matching layer 353 adjacent an acoustic face 212 of sonar transducer assembly 210 and an acoustic backing layer 352. In embodiments including acoustic matching layer 353, acoustic matching layer 353 may be configured (e.g., through selection of shape, thickness, and/or material, including variations in each) to allow multichannel transducer module 250 (and sonar transducer assembly 210) to be operated at a much wider frequency band (e.g., transmit and/or receive band) than conventional sonar systems. For example, acoustic matching layer 353 may be formed from a metal or metal oxide filled epoxy (e.g., alumina, stainless steel, copper, and/or other metal and/or metal oxide powder, flakes, microballs, and/or other type of filler). In some embodiments, a thickness of acoustic matching layer 353 may roughly correspond to a quarter-wavelength of the excitation signal (e.g., of a central frequency of the excitation signal) used to generate acoustic beams using multichannel transducer module 250.

Acoustic backing layer 352 may be configured to provide structural support for multichannel transducer module 250, to help mechanically isolate multichannel transducer module 250 from other components of sonar transducer assembly 210, and/or to help shield multichannel transducer module 250 from electromagnetic interference. In some embodiments, acoustic backing layer 352 may be formed from a relatively rigid substrate (e.g., fiberglass, other laminates, metal sheet, and/or other rigid substrates) substantially encapsulated in a relatively resilient material (e.g., rubber, foam, and/or other acoustic baffling materials).

As noted in FIG. 3A, in some embodiments, housing 211 may include waterproof layer 311a and/or mount bracket 311b. In some embodiments, waterproof layer 311a may be formed from a polyurethane plastic and/or other types of thermosetting polymers substantially transparent to acoustic signals and able to be overmoulded into and/or around housing 211 and/or multichannel transducer module 250. For example, waterproof layer 311a may form acoustic face 212 of sonar transducer assembly 210, for example, and be sealed to remaining portions of housing 211 to form housing 211. In general, housing 211 may be configured to provide structural and/or protective support for sonar transducer assembly 210. In some embodiments, at least some portions of housing 211 may be implemented from a machined, cast, and/or injection moulded material, such as a metal, ceramic, and/or plastic (e.g., a polycarbonate, polyurethane, and/or other plastic) material that can be formed into one or more rigid, pliable, and/or combination of rigid and pliable structures. Mount bracket 311b may be formed from the same or different materials, for example, and may be configured to physically couple sonar transducer assembly 210 to a mobile structure (e.g., transom 107b of mobile structure 101 in FIG. 1B). In some embodiments, mount bracket 311b, housing 211, and/or sonar transducer assembly 210 may be implemented with one, or more actuators to adjust an orientation and/or position of sonar transducer assembly 210, as described herein.

In the embodiment illustrated in FIG. 3B, multichannel sonar system 301 includes sonar transducer assembly 210 implemented with multichannel transducer module 250 and optional transducer module 364. As shown, in some embodiments, multichannel transducer module 250 may be implemented with physically differentiated transmission channel 360 and receiver channels 362, so as to differentiate the shapes of the corresponding acoustic beams and acoustic returns, as described herein. In the illustrated embodiment, transmission channel 360 may extend centrally through and beyond receiver channels 362 into an end of housing 211, thereby producing an acoustic beam that is narrower that the acoustic returns for receiver channels 362. Although the beamwidths of receiver channels 362 are wider, the effective system beamwidth would be equal to the narrower beam (e.g., the acoustic beam produced by transmission channel 360). Transmission channel 360 may be formed from one relatively long transducer element, for example, or from multiple relatively short electrically coupled transducer elements in order to reduce differentiated manufacturing costs and/or to reduce a risk of thermal warping and/or related damage.

Also shown in FIG. 3B, sonar transducer assembly 210 may be implemented with optional transducer module 364. In various embodiments, transducer module 364 may be configured to produce acoustic beams with shapes, orientations, and/or frequencies different from those produced by multichannel transducer module 250. For example, transducer module 364 may be implemented with a circular transducer element configured to produce relatively narrow conical acoustic beams, for example, to facilitate depth measurements in deep water. In other embodiments, transducer module 364 may be configured to produce acoustic beams configured to compliment operation of multichannel transducer module 250.

Figure 3D:
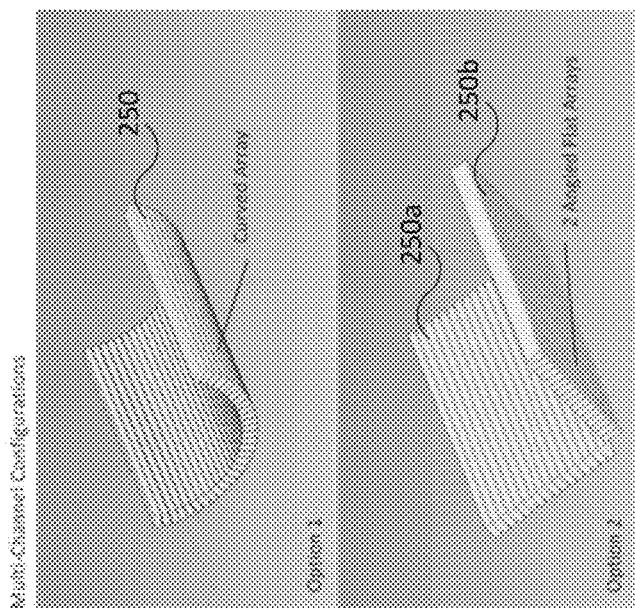
FIGS. 3C-D illustrate diagrams of various transducer configurations for multichannel sonar systems in accordance with embodiments of the disclosure.
Figure 3C:
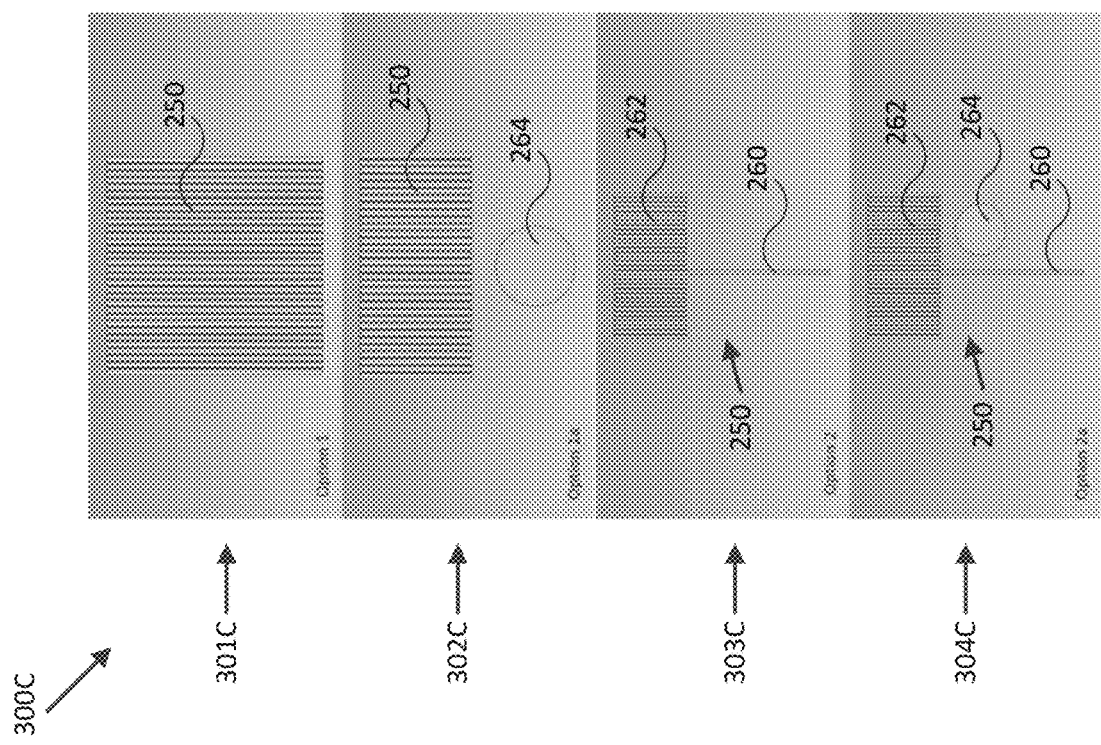

FIGS. 3C-D illustrate diagrams 300C and 300D of various transducer configurations for multichannel sonar systems in accordance with embodiments of the disclosure. For example, configuration 301C in FIG. 3C includes a single substantially square multichannel transducer module 250 with similarly sized linear transmission and receiver channels. Configuration 302C includes a single substantially rectangular multichannel transducer module 250 and a circular transducer module 264 laterally aligned with a center linear channel of multichannel transducer module 250. Configuration 303C includes a single multichannel transducer module 250 with an elongated transmission channel 260 relative to receiver channels 262. Configuration 304C includes a single multichannel transducer module 250 with an elongated transmission channel 260 relative to receiver channels 262, and a circular transducer module 264 offset from both transmission channel 260 and receiver channels 262. Diagrams 300D of FIG. 3D provide embodiments of multichannel transducer configurations adapted to provide additional width of coverage. For example, configuration 301D includes a single multichannel transducer module 250 with similarly sized linear and transmission channels, but arranged in a curved array rather than a plane array. Configuration 302D includes two spatially differentiated planar arrays 250a-b, where planar arrays 250a-b are oriented differently and are adjacent and/or adjoining along one edge. In some embodiments, planar arrays 250a-b may form a single multichannel transducer, for example, or may form multiple multichannel transducers.

As described herein, each of these configurations may be implemented with integral electronics and within a single housing of a corresponding transducer assembly. In some embodiments, multiple such embodiments may be formed within a single housing, for example, and/or may be coupled together to form a more complex multichannel sonar system.

Figure 4A:
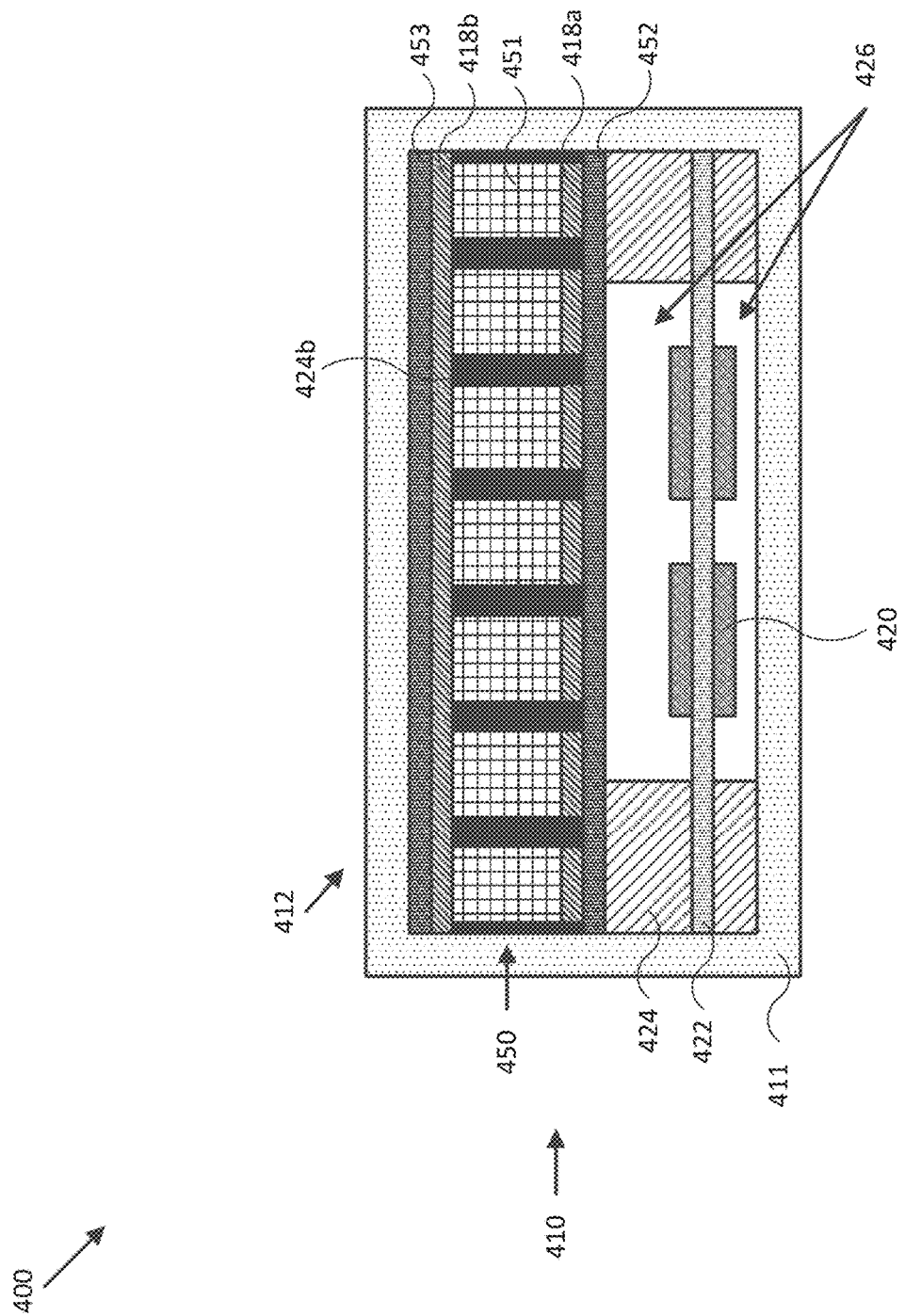
FIG. 4A illustrates a diagram of a cross section of a multichannel sonar system in accordance with an embodiment of the disclosure.

FIG. 4A illustrates a cross section 400 of a sonar transducer assembly 410 (e.g., similar to sonar transducer assembly 210 of FIG. 3A) in accordance with an embodiment of the disclosure. In the embodiment shown in FIG. 4A, sonar transducer assembly 410 includes multichannel transducer module 450 configured to emit acoustic beams and receive acoustic returns through surface 412 of housing 411. Integral electronics 420 are configured to control operation of sonar transducer assembly 410 and are electrically coupled to multichannel transducer module 450 through traces 418a and foil 418b, which may be routed, at least in part, through or around acoustic backing layer 452, and through cavities 426, spacers 424, and/or substrate 422. Substrate 422 may be configured to provide structural support for and/or electrical coupling between various elements of integral electronics 420, for example, and, in some embodiments, may be configured to provide thermal sinking for integral electronics 420 to and/or through housing 411. Spacers 424 may be configured to provide structural support for various elements of sonar transducer assembly 410, including substrate 422, integral electronics 420, and/or multichannel transducer module 450 for example, and may be configured to help provide mechanical isolation of integral electronics 420 from multichannel transducer module 450. In some embodiments, cavities 426 may be filled with a material configured to enhance thermal sinking of integral electronics 420, to increase mechanical isolation of integral electronics 420, and/or to minimize thermal stress within housing 411 caused by thermal cycling of sonar transducer assembly 410, for example.

As shown, multichannel transducer module 450 may include multiple transducer elements 451 substantially electrically and/or mechanically isolated from each other and/or a side of housing 411 by spacers 424b. In some embodiments, one or more of spacers 424b may be implemented substantially as cavities. Each transducer element 451 may be individually and/or collectively electrically coupled (e.g., soldered, clamped, conductively glued, and/or otherwise electrically coupled) to traces 418a and foil 418b and thereby to integral electronics 420. In some embodiments, multichannel transducer module 450 may include acoustic matching layer 453 disposed adjacent to emission surface 412, which may be configured to broaden an operational bandwidth of multichannel transducer module 450.

In some embodiments, sonar transducer assembly 410 may include additional transducers and/or more than one multichannel transducer, for example, and may be arranged differently from the arrangement shown in FIG. 4A. In various embodiments, multichannel transducer module 450 may include a different number of transducer elements 451 than shown in FIG. 4A. Each of transducer elements 451 may be implemented as one or more substantially linear and/or conical transducer elements, for example, and be made of a ceramic material, a metal or alloy material, a piezoelectric material, a combination of insulating and conductive materials, and/or other single or multi-layered transducing materials that can be energized by an electrical signal to produce an acoustic beam and/or that can produce electrical signals in response to acoustic returns (e.g., received through emission surface 412).

In one embodiment, one or more of transducer elements 451 may be implemented from polarized polyvinylidene difluoride (PVDF) and/or other thermoplastic polymers. In such embodiment, all transducer elements 451 may be manufactured from a single sheet of the material by forming electrodes into the required shapes and patterns for each transducer element. Such shapes can be rectangular, circular, and/or other patterns, and/or can be formed into shapes or patterns designed to reduce side lobe levels. Once formed, the shaped electrodes may be cut from the sheet and assembled to form transducer elements 451, traces 418a, and/or foil 418b of multichannel transducer module 450, for example, or the entire sheet may be used to form transducer elements 451, traces 418a, foil 418b, and/or spacers 424b, where spacers 424b may be implemented by portions of the material without electrodes.

Figure 4B:
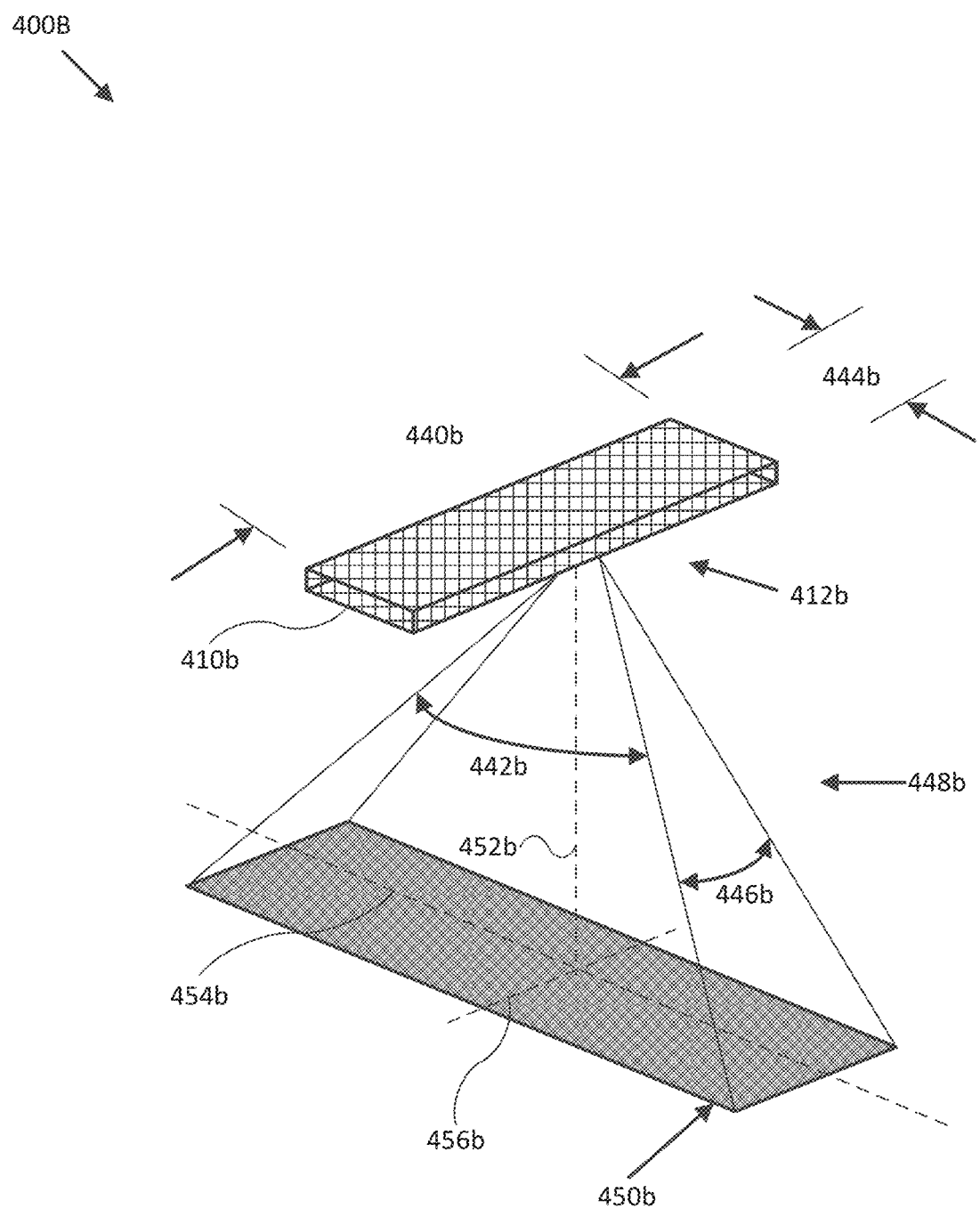
FIGS. 4B-C illustrate diagrams of sonar transducers and corresponding beams for use in a sonar system in accordance with embodiments of the disclosure.
Figure 4C:
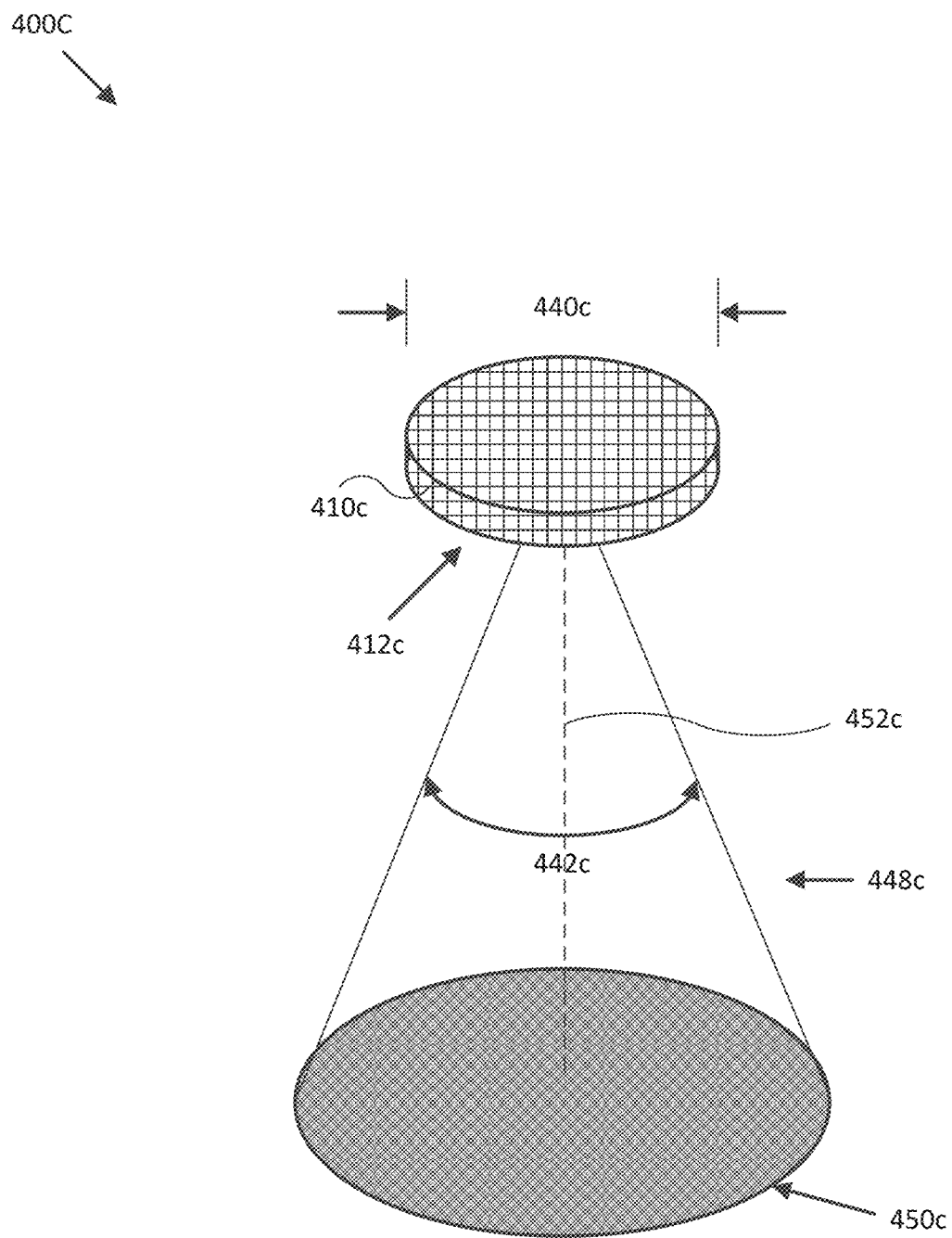

FIGS. 4B-4C illustrate diagrams 400B and 400C of various transducer elements and their corresponding acoustic beams in accordance with embodiments of the disclosure. FIG. 4B shows linear transducer element 410b producing a fan shaped acoustic beam 448b from emission surface 412b having footprint 450b, where linear transducer element 410b and emission surface 412b may correspond to transducer element 451 and emission surface 412 of sonar transducer assembly 410. The overall dimensions and shape of fan shaped acoustic beam 448b roughly correspond to the radiation pattern produced by linear transducer element 410b as referenced to half power (−3 dB) beamwidth limits of the pattern, as is known in the art. For example, longitudinal length 440b (L1) of transducer element 410b may be roughly related to the lateral beamwidth 446b (B1) by: B1~50*λ/L1, and lateral length 444b (L2) of transducer element 410b may be roughly related to the longitudinal beamwidth 442b (B2) by: B2~50*λ/L2, where λ is the wavelength of the signal used to excite transducer element 410b. Also shown are center axis 452b and orthogonal axes 454b and 456b, which may be used as references to define an orientation and/or aiming angles of transducer element 410b and/or footprint 450b, such as a depression/emission angle and/or a roll, pitch, and/or yaw of transducer element 410b and/or acoustic beam 448b.

Acoustic returns received by transducer element 410b exhibit a spatial pattern similar to that of the acoustic beam shown in FIG. 4B. Linear transducer element 410b may be used to implement a stand-alone transducer module (e.g., a down facing or a side facing transducer module) similar to multichannel transducer module 450, but with only a single channel. Two of linear transducer elements 410b may be coupled together within a single transducer module and configured to provide side view sonar, similar to configuration 302D of FIG. 3D, but with only two channels.

FIG. 4C shows circular transducer element 410c producing a conical acoustic beam 448c from emission surface 412c having footprint 450c, where circular transducer element 410c and emission surface 412c may correspond to transducer element 451 (e.g., and/or transducer 363 of FIG. 3B) and emission surface 412 of sonar transducer assembly 410. The overall dimensions and shape of conical acoustic beam 448c roughly correspond to the radiation pattern produced by circular transducer element 410c as referenced to half power (−3 dB) beamwidth limits of the pattern, as is known in the art. For example, diameter 440c (D1) of transducer element 410c may be roughly related to the beamwidth 442c (B1) by: B1~65*λ/D1, where λ is the wavelength of the signal used to energize transducer element 410c. Also shown is center axis 452c, which may be used as a reference to define an orientation and/or aiming/emission angle of transducer element 410c and/or footprint 450c, such as a depression angle and/or a roll and/or pitch of transducer element 410c and/or acoustic beam 448c.

Acoustic returns received by transducer element 410c exhibit a spatial pattern similar to that of the acoustic beam shown in FIG. 4C. Circular transducer element 410C may be used to implement a stand-alone transducer module (e.g., a down facing transducer module) similar to multichannel transducer module 450, but with only a single channel.

In some embodiments, linear transducer element 410b and/or circular transducer element 410c may be implemented as a transducer element assembly, for example, including multiple individual transducer elements coupled together electrically and/or physically to act as a single transducer element. For instance, in one embodiment, linear transducer element 410b may be implemented as multiple rectangular, circular, and/or otherwise shaped elements soldered together and arranged in a shape roughly corresponding to the shape of linear transducer element 410b, so as to collectively produce fan shaped acoustic beam 448b. In another embodiment, circular transducer element 410c may be implemented as multiple circular, rectangular, and/or otherwise shaped elements soldered together and arranged in an overall shape roughly corresponding to the circular shape of circular transducer element 410c, so as to collectively produce conical acoustic beam 448c. In such embodiments, interstitial spaces between elements may be filled with a material to help secure the elements to each other and form a transducer element assembly. In one embodiment, the interstitial material may be similar the material used for acoustic matching layer 453.

In various embodiments, the orientation and/or aiming angles, the longitudinal beamwidth 442b, lateral beamwidth 446b, and/or beamwidth 442c may be selected (e.g., by adjusting the orientation and/or angles, by selecting a shape and/or size of linear transducer element 410b and/or circular transducer 410c, and/or by adjusting the excitation wavelength) to emphasize detail (e.g., narrower acoustic beams and/or smaller excitation wavelengths) in a particular direction, to emphasize breadth of coverage (e.g., broader acoustic beams and/or larger excitation wavelengths) in a particular direction, and/or to emphasize penetration distance (e.g., narrower acoustic beams and/or larger excitation wavelengths), for example, among other sonar system characteristics. Embodiments of the present disclosure provide the ability to adjust such characteristics according to the local environment (e.g., shallow water, deep sea, approach to a shallow submerged object, tracking of a deep school of fish), according to an operational state of a coupled mobile structure (e.g., narrow, forward looking, and quickly updated depth measurements while at speed, broad side and down looking and/or target searching while at rest searching for fish), and/or according to other orientation, position, and/or operational characteristics of a coupled mobile structure.

Figure 5:
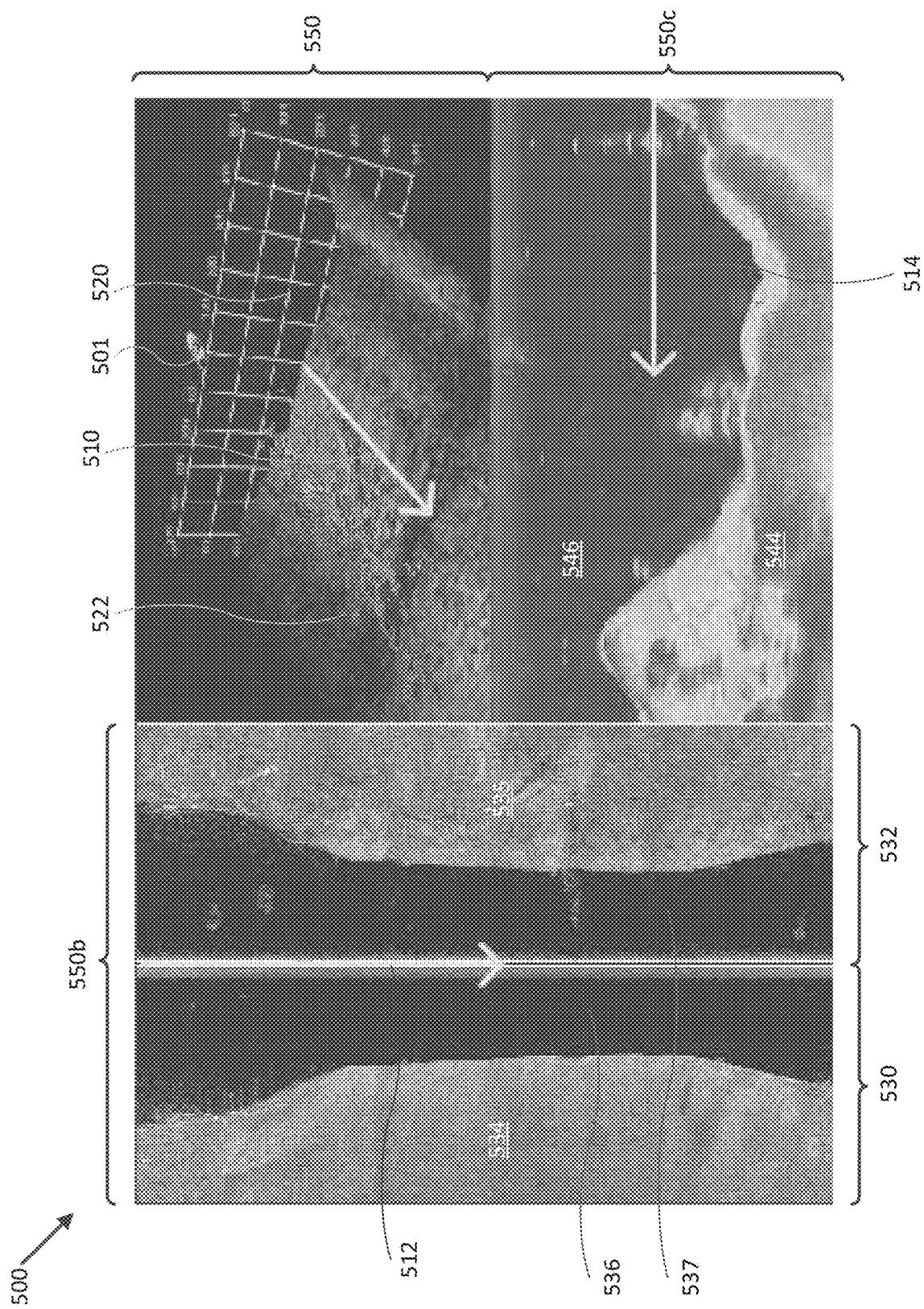
FIGS. 5-7 illustrate various display views of sonar data provided by a sonar system in accordance with embodiments of the disclosure.
Figure 6:
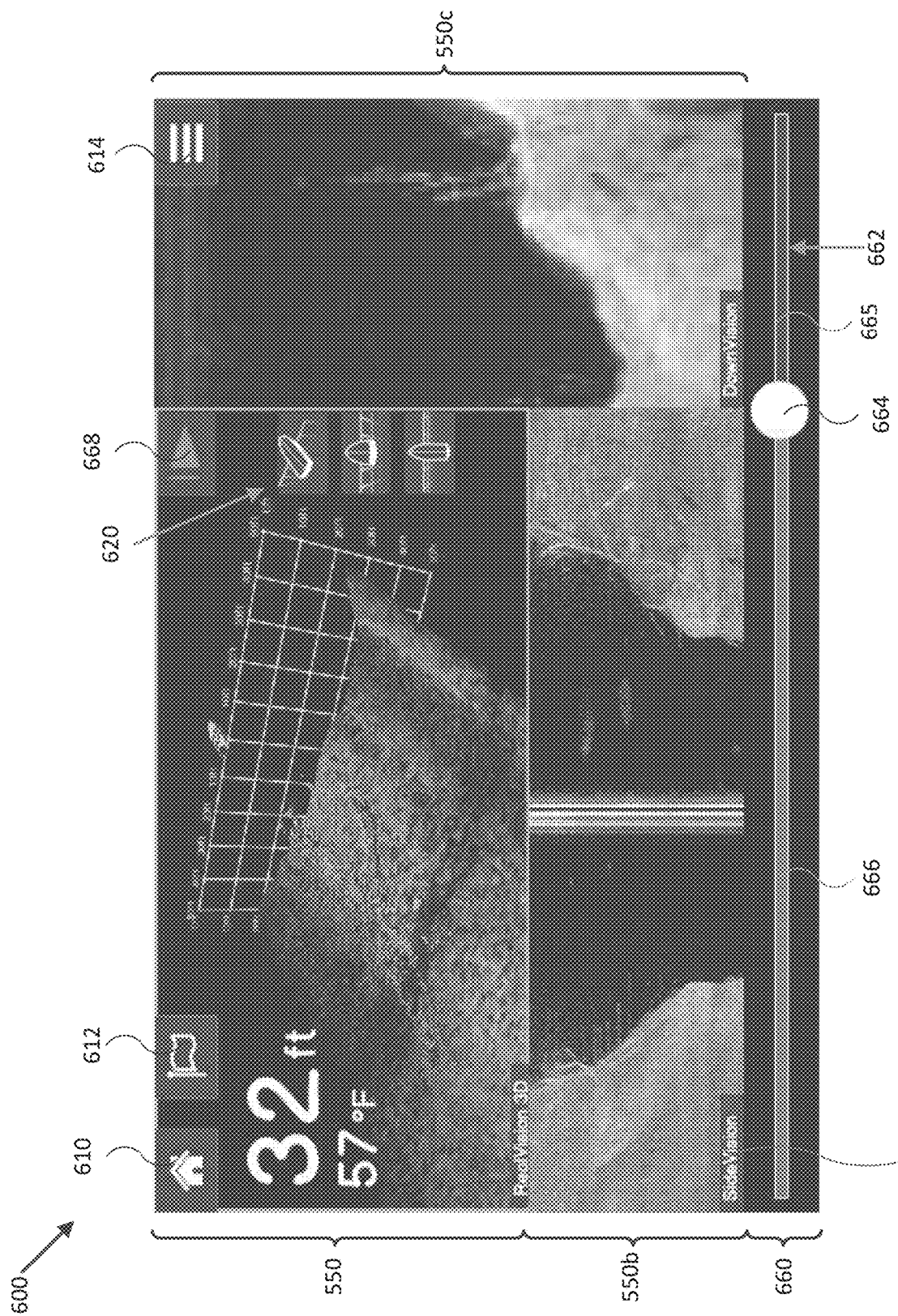
Figure 7:
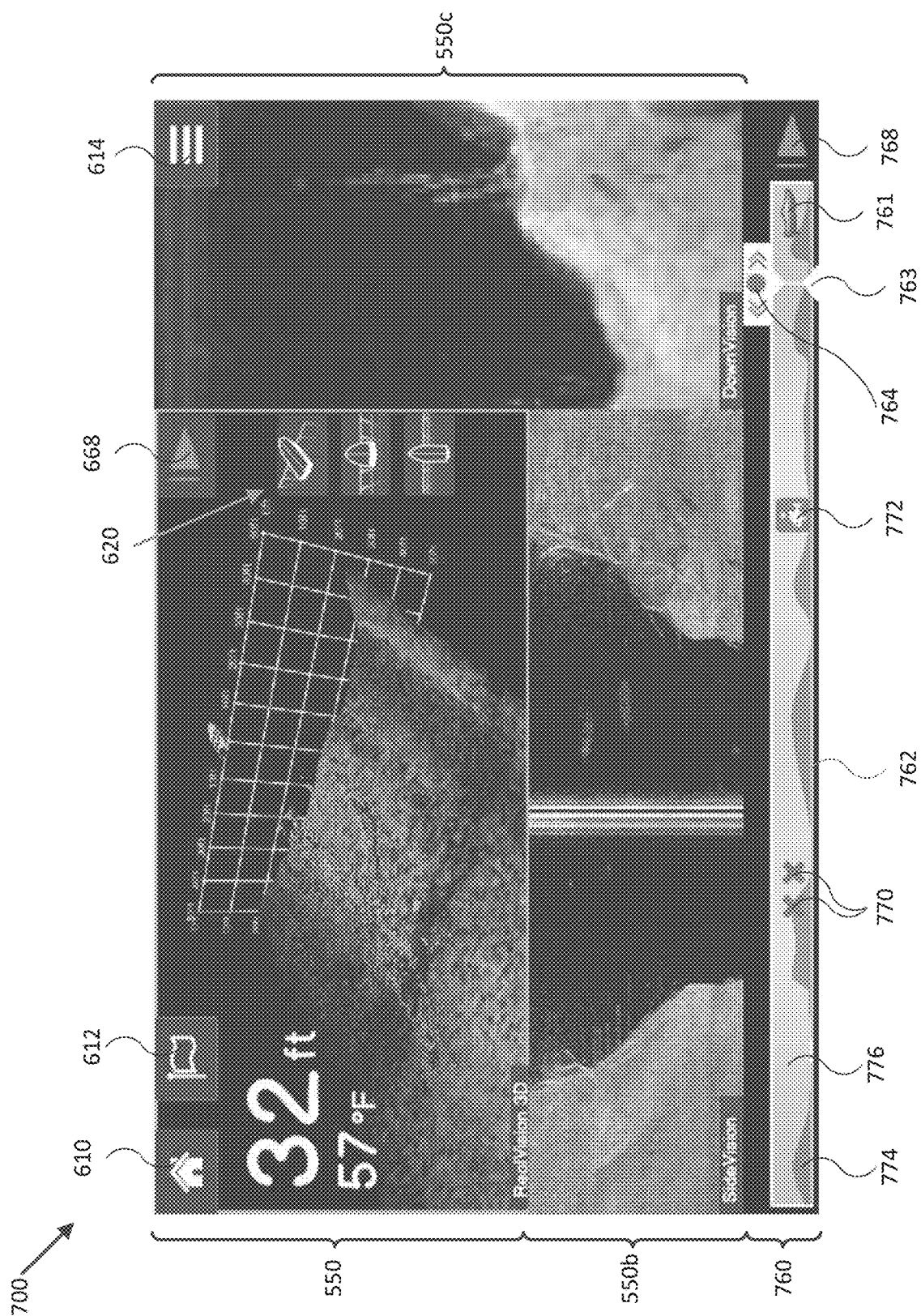

FIGS. 5-7 illustrate various display views of sonar data provided by a sonar system in accordance with embodiments of the disclosure. For example, display view 500 of FIG. 5 illustrates three different sonar image data sets 550, 550b, and 550c derived from corresponding time series of acoustic returns received by multichannel sonar transducer module 250, a side view transducer module (e.g., corresponding to configuration 302D of FIG. 3D, but with one single linear transducer element 410b replacing each of planar arrays 250a and 250b), and a down view transducer module (e.g., corresponding to a single linear transducer element 410b and/or a single circular transducer element 410c, arranged similarly to transducer module 264 or replacing multichannel transducer module 250 of sonar transducer assembly 210 in FIG. 3A). More generally, display view 500 illustrates aggregate views of a water column and bed ensonified by sonar system 110. In other embodiments, display view 500 may only include two of sonar image data sets 550, 550b, and 550c. In further embodiments, two or more of sonar image data sets 550, 550b, and 550c may be derived solely from corresponding time series of acoustic returns received by multichannel sonar transducer module 250 (e.g., configured to operate as a side view and/or down view transducer module through appropriate allocation of transmitter and receiver channels).

As shown, each of sonar image data sets 550, 550b, and 550c include sonar image data captured for a period of time, with the most recent sonar image data displayed at the base of each temporal indicator (arrow) 510, 512, and 514. For example, sonar image data set 550 is shown as scrolling from dimension indicator grid 520 (e.g., aligned with a present position and/or orientation of mobile structure 101, as indicated by mobile structure indicator 501) in the direction of temporal indicator 510, such that 3D surface 522 (e.g., corresponding to a bathymetric survey of a sea floor rendered within display view 500, for example) is represented by relatively old sonar image data at the lower left corner of display window 550. Sonar image data set 550b is shown as scrolling down along temporal indicator 512, and sonar image data set 550c is shown as scrolling (conventionally) from right to left along temporal indicator 514. Also shown in FIG. 5 are respective port and starboard water column portions 536 and 537 and port and starboard sea/body of water floor/bed portions 534 and 535 of sonar image data set 550b corresponding to port and starboard side view sonar channels 530 and 532, and water column portion 546 and floor/bed portion 544 of sonar image data set 550c.

In addition, depending on the time sonar system 110 has been operating, and the resolution of the sonar image data within display view 500, each of sonar image data sets 550, 550b, and 550c may additionally include portions not shown in display view 500. For example, if display view 500 is showing current sonar image data, portions of the various sonar image data sets corresponding to older sonar image data may be stored in a memory of system 100, such that the older sonar image data may be retrieved and displayed in a display view similar to display view 500. In general, sonar image data sets 550, 550b, and/or 550c may be arranged differently within display view 500, for example, and temporal scrolling within each image data set may be selected to be in any direction.

Display view 600 of FIG. 6 illustrates 3D sonar image data set 550, side view sonar image data set 550b, and down view image data set 550c of FIG. 5 rendered with historical view selector 660, as shown. In the embodiment shown in FIG. 6, historical view selector 660 is relatively simplified and includes only user selector 664 that may be moved (e.g., by user input provided to user interface 120) along timeline indicator 662 to identify a particular selected view time within a period of time corresponding to at least one of sonar image data sets 550, 550b, and 550c (e.g., corresponding to stored or recorded sonar image data of one or more of the displayed sonar image data sets). Sonar image data sets without recorded data for a particular time may be rendered blank.

For example, the left endpoint of timeline indicator 662 may correspond to powering sonar system 110 and/or one or more transducer modules within sonar system 110 and a time of beginning recording of at least one set of corresponding sonar image data, and the right endpoint of timeline indicator 662 may correspond to the time of current sonar image data. In some embodiments, the left endpoint may correspond to the earliest available sonar image data (e.g., as limited by available memory buffer and/or storage space). Assignment of current/beginning time to either of the left or right endpoints of timeline indicator 662 may be set by user input for example, and timeline indicator 662 may include history buffer indicator 666 and future buffer indicator 665 to help distinguish past view times from present view times and/or future view time (e.g., relative to a position of user selector 664). In various embodiments, display view 600 may also include timeline play button 668, which may be used to start playback of displayed sonar image data sets from a selected view time through to a present time. A single selection of timeline play button 668 may playback displayed sonar image data sets at a "real time" playback speed, for example, or a slower or faster speed, and multiple selections of timeline play button 668 may cycle through a series of different playback speeds (e.g., 0.5×, 1×, 2×, 5×, 10×, and/or other multiples of real time playback), and/or a double selection of timeline play button 668 (e.g., a double touch or double-click) may reset display view 600 to present time and return display view 600 to normal operation.

Also shown in display view 600 are optional home button 610 (e.g., to exit display view 600 and return to a home screen for user interface 120), waypoint button 612 (e.g., to initiate a waypoint selection process, where a user may indicate a position within any spatial or temporal portion of sonar image data sets 550, 550*b*, and/or 550*c* for placement of a waypoint, by user selection within one of sonar image data sets 550, 550*b*, and/or 550*c* as displayed in display view 600), contextual menu button 614 (e.g., to cause user interface 120 to render a contextual menu for display view 600, including at least one of a sonar image data set display enable/disable selector or a start or stop recording selector to start or stop recording of sonar image data for one or more image data sets displayed on display view 600), sonar image data set indicators/labels 616 (e.g., to indicate the source of the sonar image data), 3D view selector buttons 620, and/or other related information indicators (e.g., depth, water temp, and/or other indicators). User selection of any element of display view 600 may be through operation of a user touch (e.g., on a touch screen), one or more buttons, a mouse or joystick, and/or other user selection devices coupled to and/or integrated with user interface 120.

Display view 700 of FIG. 7 illustrates 3D sonar image data set 550, side view sonar image data set 550*b*, and down view image data set 550*c* of FIGS. 5 and 6 rendered with historical view selector 760, as shown. As shown in the embodiment presented by FIG. 7, historical view selector 760 may include a variety of rendered features to help a user navigate a recorded history of sonar image data. For example, timeline indicator 762 of historical view selector 760 may include depth profile indicator 774 (e.g., a line or graph, which may be normalized to a particular or dynamic depth range to account for large variations in depth, such that the vertical scale is maximized) and/or water temperature profile indicator 776 (e.g., a color or grey scale spectrum overlay, corresponding to water temperatures measured by water temperature sensor 266), each of which indicate a water depth and/or water temperature measured at a view time corresponding to a particular position along timeline indicator 762. Timeline indicator 762 may also include generic waypoint indicators 770 (e.g., indicating a generic point of interest, such as a sudden change in water depth, a relatively high water temperature, and/or a charted navigational buoy) and/or contextual waypoint indicator 772 (e.g., which may be rendered with a graphic indicating the particular context, such as the profile of a fish to indicate detections and/or identifications of fish in a water column, for example, and/or a magnitude indicator, such as one or more stars indicating a density of detected/identified fish) indicating waypoint selected, identified, or detected at a view time corresponding to a particular position along timeline indicator 762.

Timeline indicator 762 may include user selector 764 and a separate view time indicator 763 that may be used to finely identify and/or select (e.g., through visual feedback to a user) a particular view time according to features rendered within depth profile indicator 774 and/or water temperature profile indicator 776, for example, or according to a particular position of generic and/or contextual waypoint indicators 770/772, relative to the length of timeline indicator 762. Present time indicator 761 may be included in timeline indicator 762 so as to identify a present time within the displayed timeline (e.g., if timeline indicator 762 is stretched or scrolled such that the present time isn't displayed within timeline indicator 762). Timeline play button 768 (e.g., which may operate similar to timeline play button 668) may optionally be included in timeline indicator 762 to, for example, omit timeline play button 668 from other portions of display view 700.

In some embodiments, a user may select a particular view time (e.g., along timeline indicator 662/762) by manipulating user selector 664/764 through user input. In other embodiments, where display view 600/700 is rendered on a touch screen display, a user may select a particular view time by swiping any of sonar image data sets/display windows 550, 550*b*, and/or 550*c* along or against a temporal scrolling direction corresponding to the particular data set/display window (e.g., corresponding to temporal indicators 510, 512, and/or 514). In further embodiments, a user may select a particular view time by tapping and holding a particular position within sonar image data sets/display windows 550, 550*b*, and/or 550*c* (e.g., corresponding to a particular view time) for a preset period of time (e.g., 2 seconds). If selecting a position within a 3D sonar image data set, the selected view time may correspond to the earliest or latest sonar image data corresponding to the selected position, for example, or may correspond to the average or median of all the times of sonar image data corresponding to the selected position. Rendering of historical view selector 660/760 may be enabled/disabled by user selection of a corresponding enable/disable view selector within a contextual menu, for example, or by user selection of a particular view time using any of the techniques described herein (e.g., including swiping and/or tapping and holding performed on a touch screen). In further embodiments, a user may identify a selected view time while historical view selector 660/760 is not rendered within display view 600/700 (e.g., by selecting an off-screen button, swiping and/or tapping and holding performed on a touch screen, and/or other techniques).

In general, when sonar system 110 is in paused/scroll back mode (e.g., historical data view mode), historical view selector 660/760 may be rendered in a zone outside the main application area (e.g., the portion of display view 600/700 dedicated to sonar image data sets 550, 550*b*, and/or 550*c*). Historical view selector 660/760 represents the recorded sonar history, with the newest data corresponding to the right-hand end, and the oldest data the left end, in the embodiments illustrated by FIGS. 6 and 7. When a user selects and manipulates user selector 664/764, it rewinds the current sonar display windows to the position in the history buffer that corresponds to the selected view time and displays the portions of the sonar image data sets corresponding to the selected view time. All sonar application panes scroll in sync such that their axes are aligned to the same selected view time in the timeline.

In various embodiments, each of the display views illustrated in FIGS. 5-7 may be formed using embodiments of sonar transducer assembly 210, multichannel transducer module 250, transducer module 264, and/or transducer modules corresponding to embodiments of transducer elements 410*b* and 410*c* (e.g., side view and/or down view transducer modules) for example, and/or approximately the same set of data processed differently according to user input, configuration parameters, and/or other operational states of sonar transducer assembly 210 (e.g., using single channels of multichannel transducer module 250). Additionally, sonar transducer assembly 210 may be configured to render and/or display (e.g. using user interface 120) multiple different display views side by side, for example, and display characteristics and/or arrangements in each of the display views depicted in FIGS. 5-7 may be used in any combination or sub-combination to form different display views with one or more of the described display characteristics and/or arrangements.

Figure 8:
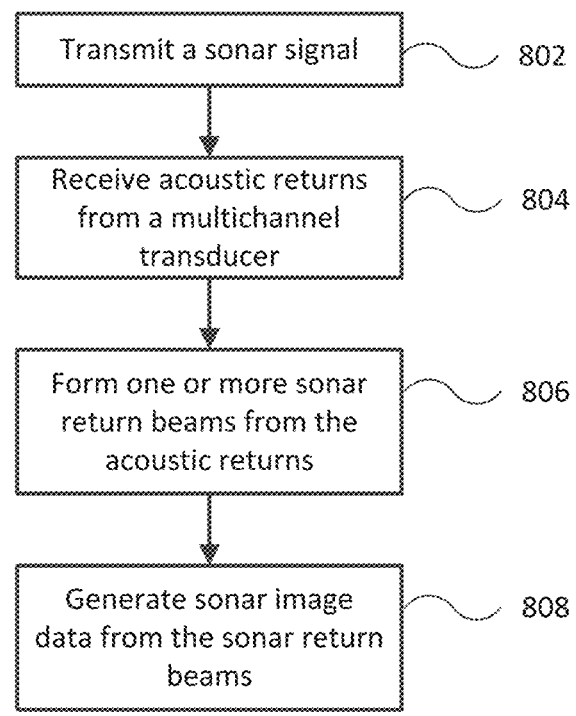
FIG. 8 illustrates a flow diagram of various operations to operate a sonar system including a multichannel sonar transducer module in accordance with an embodiment of the disclosure.

FIG. 8 illustrates a flow diagram of process 800 to provide sonar data and/or imagery for mobile structure 101 in accordance with embodiments of the disclosure. In some embodiments, the operations of FIG. 8 may be implemented as software instructions executed by one or more logic devices associated with corresponding electronic devices, sensors, and/or structures depicted in FIGS. 1A through 4C. More generally, the operations of FIG. 8 may be implemented with any combination of software instructions and/or electronic hardware (e.g., inductors, capacitors, amplifiers, actuators, or other analog and/or digital components).

It should be appreciated that any step, sub-step, sub-process, or block of process 800 may be performed in an order or arrangement different from the embodiments illustrated by FIG. 8. For example, in other embodiments, one or more blocks may be omitted from the process, and other blocks may be included in the process. Furthermore, block inputs, block outputs, various sensor signals, sensor information, calibration parameters, and/or other operational parameters may be stored to one or more memories prior to moving to a following portion of the process. Although process 800 is described with reference to systems and elements of FIGS. 1A-40, process 800 may be performed by other systems different from those systems and including a different selection of electronic devices, sensors, assemblies, mobile structures, and/or mobile structure attributes.

Process 800 represents a method for providing sonar data and/or imagery for mobile structure 101 using systems 100, 100B, 200, 300, 301, and/or 400 in accordance with embodiments of the disclosure. At the initiation of process 800, various system parameters may be populated by prior execution of a process similar to process 800, for example, or may be initialized to zero and/or one or more values corresponding to typical, stored, and/or learned values derived from past operation of process 800, as described herein.

In block 802, a logic device transmits a sonar signal. For example, controller 220 and/or co-controller 222 of sonar transducer assembly 210 may be configured to control transmitter 230 to provide a shaped or unshaped transmission signal to transmission channel 260 of multichannel transducer module 250 and produce a corresponding acoustic beam. In some embodiments, controller 220 and/or co-controller 222 may be configured to control transceiver 234 to provide a shaped or unshaped transmission signal to transducer module 264 and produce a corresponding acoustic beam. In various embodiments, sonar transducer assembly 210 may be configured to use temperature sensor 266 and/or orientation/position sensor 240 to record corresponding measurements at substantially the same time. Notification of transmission and/or other sensor information may be relayed to other devices of system 100 through cable 214.

In block 804, a logic device receives acoustic returns from a multichannel transducer. For example, controller 220 and/or co-controller 222 may be configured to control one or more of receivers 232 to receive acoustic returns from one or more of receive channels 262 of multichannel transducer module 250, for example, and provide the received acoustic returns (e.g., in digital form) to co-controller 222. In other embodiments, controller 220 and/or co-controller 222 may be configured to control transceiver 234 to receive acoustic returns from transducer module 264 and provide the received acoustic returns (e.g., in digital form) to co-controller 222. In some embodiments, receivers 232 and/or transceiver 234 may be configured to convey the acoustic returns to co-controller 222 over a baseband channel. In other embodiments, receivers 232, transceiver 234, and/or co-controller 222 may be configured to decimate the acoustic returns before performing further processing. In various embodiments, sonar transducer assembly 210 may be configured to use temperature sensor 266 and/or orientation/position sensor 240 to record corresponding measurements at substantially the same time. Notification of reception and/or other sensor information may be relayed to other devices of system 100 through cable 214.

In block 806, a logic device forms one or more sonar return beams from the acoustic returns. For example, controller 220 and/or co-controller 222 may be configured to perform beamforming, interferometry, and/or inter-beam interpolation processing on the acoustic returns received in block 804 to form the one or more sonar return beams. In some embodiments, such processing may be performed on acoustic returns grouped from two, three, or more receive channels, for example, depending on the desired number of beams, the desired range of beam orientations, and/or other system configuration parameters. In various embodiments, controller 220 and/or co-controller 222 may be configured to determine an inter-beam angle conversion basis for each sonar return beam, which may be used to determine accurate return beam signal amplitudes as a function of the angle for each sonar return beam, as described herein. In some embodiments, controller 220 and/or co-controller 222 may be configured to decimate, scale, filter, and/or otherwise process or post-process the sonar return beams before storing the amplitudes, inter-beam angles, and/or other characteristics of the sonar return beams (e.g., for each sample) and proceeding to block 808. Notification of processing and/or other sensor information may be relayed to other devices of system 100 through cable 214.

In block 808, a logic device generates sonar image data from the sonar return beams. For example, controller 220 and/or co-controller 222 may be configured to process the individual sonar return beams (e.g., according to their corresponding orientation angles and/or signal amplitudes) into depth (e.g., time from transmission to reception), position (e.g., orientation angle for the sonar return beam), and/or intensity (e.g., signal amplitude) sonar data, for each sample. Controller 220 and/or co-controller 222 may be configured to convert such sonar data and/or samples into two dimensional and/or three dimensional sonar imagery and/or display views, as described herein. In some embodiments, controller 220 and/or co-controller 222 may be configured to use corresponding recorded temperature, orientation, and/or position measurements to align acoustic returns, samples, sonar data, and/or imagery with each other and/or one or more directions, such as down. Sonar data, imagery, display views, and/or other sensor information may be relayed to other devices of system 100 (e.g., user interface 120) through cable 214. In some embodiments, sonar transducer assembly 210 may be configured to display sonar data, imagery, display views, and/or other sensor information to a user through use of user interface 120, for example, such as receiving user selection of a desired display view and then relaying corresponding sonar data and/or imagery to user interface 120.

It is contemplated that any one or combination of methods to provide sonar data and/or imagery may be performed according to one or more operating contexts of a control loop, for example, such as a startup, learning, running, and/or other type operating context. For example, process 800 may proceed back to block 802 and proceed through process 800 again to produce updated sonar data and/or imagery, as in a control loop. In addition, similar processes may be used to generate sonar image data derived from acoustic returns received by different types of transducer modules, including single or dual channel side view transducer modules and/or single channel down view transducer modules.

Figure 9:
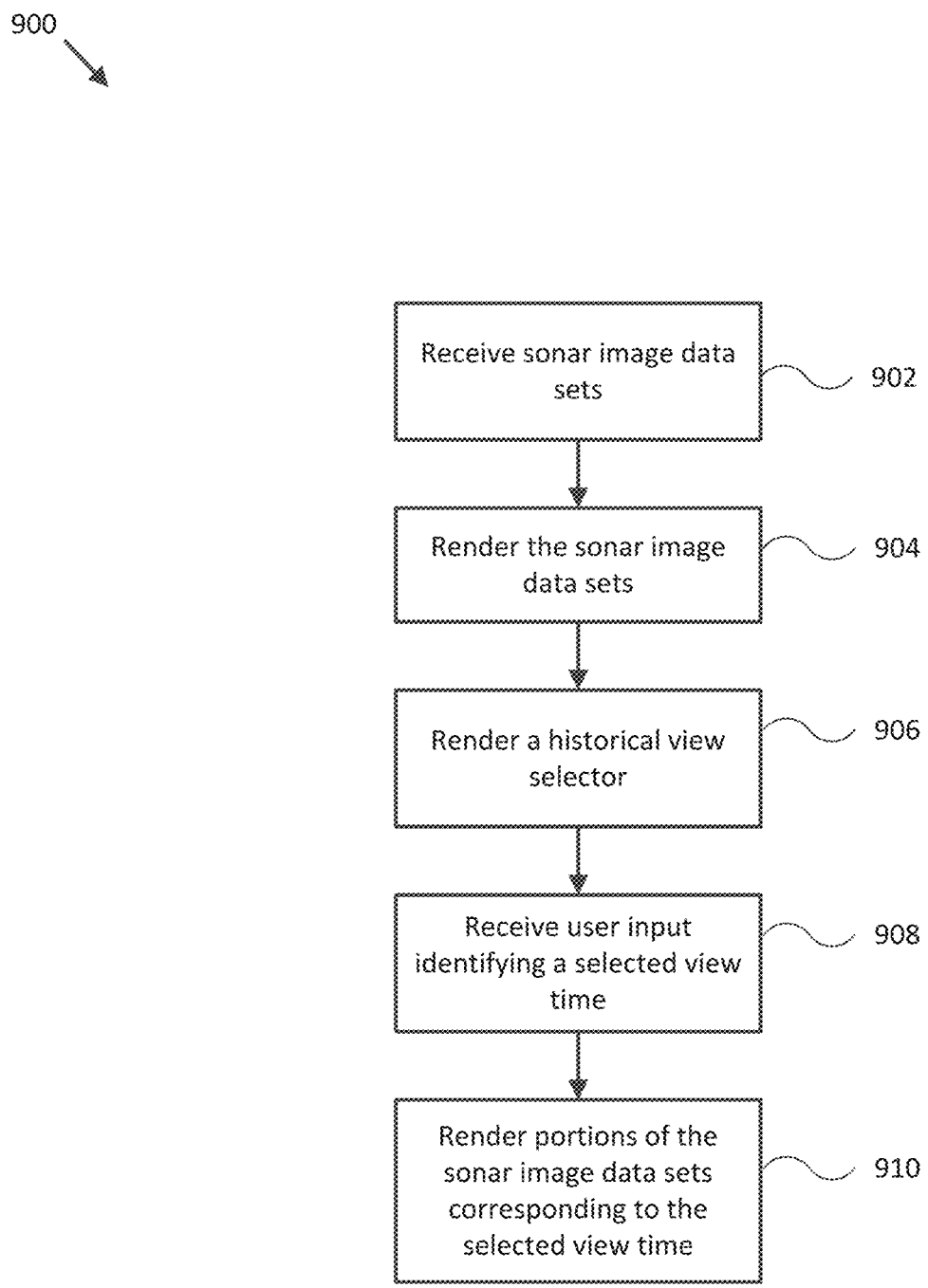
FIG. 9 illustrates a flow diagram of various operations to control display of sonar image data in accordance with an embodiment of the disclosure.

FIG. 9 illustrates a flow diagram of process 900 to control display of sonar image data for mobile structure 101 in accordance with embodiments of the disclosure. In some embodiments, the operations of FIG. 9 may be implemented as software instructions executed by one or more logic devices associated with corresponding electronic devices, sensors, and/or structures depicted in FIGS. 1A through 4C. More generally, the operations of FIG. 9 may be implemented with any combination of software instructions and/or electronic hardware (e.g., inductors, capacitors, amplifiers, actuators, or other analog and/or digital components).

It should be appreciated that any step, sub-step, sub-process, or block of process 900 may be performed in an order or arrangement different from the embodiments illustrated by FIG. 9. For example, in other embodiments, one or more blocks may be omitted from the process, and other blocks may be included in the process. Furthermore, block inputs, block outputs, various sensor signals, sensor information, calibration parameters, and/or other operational parameters may be stored to one or more memories prior to moving to a following portion of the process. Although process 900 is described with reference to systems and elements of FIGS. 1A-40, process 900 may be performed by other systems different from those systems and including a different selection of electronic devices, sensors, assemblies, mobile structures, and/or mobile structure attributes.

Process 900 represents a method for controlling display of sonar image data for to a user of mobile structure 101 using systems 100, 100B, 200, 300, 301, and/or 400 in accordance with embodiments of the disclosure. At the initiation of process 900, various system parameters may be populated by prior execution of a process similar to process 900, for example, or may be initialized to zero and/or one or more values corresponding to typical, stored, and/or learned values derived from past operation of process 900, as described herein.

In block 902, a logic device receives sonar image data sets. For example, user interface 120 and/or controller 130 of sonar system 110 may be configured to receive at least first and second sonar image data sets (e.g., sonar image data sets 550, 550b, and/or 550c) from controllers of corresponding sonar transducer assemblies (e.g., controller 220 and/or co-controller 222 of sonar transducer assembly 210). In other embodiments, such sonar image data sets may be retrieved from memory. Such sonar image data sets may be derived from corresponding first and second time series of acoustic returns received by respective first and second sonar transducer modules (e.g., multichannel transducer module 250 and transducer module 264).

In block 904, a logic device renders sonar image data sets. For example, user interface 120 and/or controller 130 may be configured to render the sonar image data sets received in block 902 in display view 500, 600, or 700. In some embodiments, two or more of sonar image data sets 550, 550b, and/or 550c may be rendered in display views 500, 600, or 700, for example, along with various other indicators, selectors, and/or graphics, as described herein.

In block 906, a logic device renders a historical view selector. For example, user interface 120 and/or controller 130 may be configured to render historical view selector 660 of FIG. 6 in display view 600 or historical view selector 760 of FIG. 7 in display view 700, where historical view selector 600 or 700 is configured to provide for selection of a particular view time in a period of time corresponding to at least one of the sonar image data sets received in block 902. In some embodiments, the historical view selector includes a timeline indicator with a length corresponding to the period of time associated with at least one of the received sonar image data sets and a user selector rendered over or adjacent to a portion of the timeline indicator, where the user input identifying the selected view time includes user input manipulating a position of the user selector along the length of the timeline indicator. In related embodiments, the historical view selector includes a history buffer indicator rendered on a first side of the length of the timeline indicator relative to the user selector and/or a future buffer indicator rendered on a second side of the length of the timeline indicator relative to the user selector, different from the first side of the length of the timeline indicator, where the two buffer indicators help differentiate past view times from the present view time (e.g., or future view times, relative to the user selector).

In other embodiments, the historical view selector includes the timeline indicator and a depth profile indicator rendered along the length of the timeline indicator and/or a water temperature profile indicator rendered along the length of the timeline indicator. The historical view selector may also include one or more waypoint indicators rendered along the length of the timeline indicator and configured to indicate corresponding one or more waypoint view times corresponding to when the waypoint was selected, identified, and/or detected within the sonar image data sets, for example, and/or a view time indicator rendered over at least a portion of the timeline indicator and configured to provide visual feedback of the selected view time relative to the length of the timeline indicator.

In block 908, a logic device receives selection of a view time. For example, user interface 120 and/or controller 130 may be configured to receive user input identifying a selected view time within the period of time provided for by the historical view selector identified in block 906. In various embodiments, the user input may include selection of a user selector rendered as part of the historical view selector, selection of a physical button of the user interface, movement of a joystick, controller, or cursor of the user interface in a direction against or along a temporal scrolling direction of the sonar image data sets, swiping, on a touch screen display of the user interface, the sonar image data sets against or along a temporal scrolling direction of the sonar image data sets, and/or tapping and holding a particular position within the sonar image data sets corresponding to the selected view time.

In block 910, a logic device renders portions of sonar image data sets corresponding to a selected view time. For example, user interface 120 and/or controller 130 may be configured to render portions of the sonar image data sets received in block 902 corresponding to the view time selected in block 908. In some embodiments, user interface 120 and/or controller 130 may be configured to render a user-selectable timeline play button on the display of the user interface, where a first user selection of the timeline play button starts playback of the sonar image data sets from the selected view time at a substantially real time playback speed, a plurality of user selections of the timeline play button starts playback of the sonar image data sets from the selected view time at a multiple of the substantially real time playback speed, and/or a double user selection of the timeline play button resets the selected view time to a present time and starts a real time playback of the sonar image data sets, as described herein. In general, the sonar transducer modules may include some combination of a multichannel sonar transducer module, a side view transducer module, and a down view transducer module, including one of each type of sonar transducer module.

It is contemplated that any one or combination of methods to provide control of display of sonar image data may be performed according to one or more operating contexts of a control loop, for example, such as a startup, learning, running, and/or other type operating context. For example, process 900 may proceed back to block 902 and proceed through process 900 again to produce updated sonar data and/or imagery, as in a control loop.

Embodiments of the present disclosure can thus provide feature-filled, reliable, multi-faceted, and accurate sonar systems, data, and/or imagery. Such embodiments may be used to provide sonar data to assist in navigation and/or mapping for a mobile structure and/or to assist in the operation of other systems, devices, and/or sensors coupled to the mobile structure.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
a user interface configured to accept user input and display at least first and second sonar image data sets to a user of a mobile structure, wherein the first and second sonar image data sets are derived from corresponding first and second time series of acoustic returns received by respective first and second sonar transducer modules coupled to the mobile structure; and
a logic device configured to communicate with the user interface, wherein the logic device is configured to:
render a historical view selector on a display of the user interface, wherein the historical view selector is configured to provide for selection of a particular view time in a period of time associated with the first and/or second sonar image data sets;
receive user input identifying a selected view time within the period of time; and
render first and second portions of the respective first and second image data sets, corresponding to the selected view time, on the display of the user interface.

2. The system of claim 1, wherein the historical view selector comprises:
a timeline indicator comprising a length corresponding to the period of time associated with the first and/or second sonar image data sets; and
a user selector rendered over or adjacent to a portion of the timeline indicator, wherein the user input identifying the selected view time comprises user input manipulating a position of the user selector along the length of the timeline indicator.

3. The system of claim 2, wherein the historical view selector comprises:
a history buffer indicator rendered on a first side of the length of the timeline indicator relative to the user selector and/or a future buffer indicator rendered on a second side of the length of the timeline indicator relative to the user selector, different from the first side of the length of the timeline indicator.

4. The system of claim 1, wherein the mobile structure comprises a watercraft, and wherein the historical view selector comprises:
a timeline indicator comprising a length corresponding to the period of time associated with the first and/or second sonar image data sets;
a depth profile indicator rendered along the length of the timeline indicator; and
a water temperature profile indicator rendered along the length of the timeline indicator.

5. The system of claim 1, wherein the historical view selector comprises:
a timeline indicator comprising a length corresponding to the period of time associated with the first and/or second sonar image data sets; and
one or more waypoint indicators rendered along the length of the timeline indicator and configured to indicate corresponding one or more waypoint view times corresponding to when the waypoint was selected, identified, and/or detected within the first and/or second sonar image data sets.

6. The system of claim 1, wherein the historical view selector comprises:
a timeline indicator comprising a length corresponding to the period of time associated with the first and/or second sonar image data sets; and
a view time indicator rendered over at least a portion of the timeline indicator and configured to provide visual feedback of the selected view time relative to the length of the timeline indicator.

7. The system of claim 1, wherein the received user input comprises:
selection of a user selector rendered as part of the historical view selector;

selection of a physical button of the user interface;
movement of a joystick, controller, or cursor of the user interface in a direction against or along a temporal scrolling direction of the first or second sonar image data sets;
swiping, on a touch screen display of the user interface, the first or second sonar image data sets against or along a temporal scrolling direction of the first or second sonar image data sets; or
tapping and holding, on a touch screen display of the user interface, a particular position within the first or second sonar image data sets corresponding to the selected view time.

8. The system of claim 1, wherein the logic device is configured to render a user-selectable timeline play button on the display of the user interface, and wherein:
a first user selection of the timeline play button starts playback of the first and second sonar image data sets from the selected view time at a substantially real time playback speed;
a plurality of user selections of the timeline play button starts playback of the first and second sonar image data sets from the selected view time at a multiple of the substantially real time playback speed; and/or
a double user selection of the timeline play button resets the selected view time to a present time and starts a real time playback of the first and second sonar image data sets.

9. The system of claim 1, further comprising the first and second sonar transducers, wherein:
the first and second sonar transducer modules comprise two different sonar transducer modules selected from the set of a multichannel sonar transducer module, a side view transducer module, and a down view transducer module.

10. The system of claim 1, wherein:
the user interface is configured to display at least a third sonar image data set to the user of the mobile structure;
the third sonar data set is derived from a corresponding third time series of acoustic returns received by a third sonar transducer module coupled to the mobile structure;
the historical view selector is configured to provide for selection of a particular view time in a period of time associated with the first, second, and/or third sonar image data sets; and
the logic device is configured to render a third portion of the third image data set, corresponding to the selected view time, on the display of the user.

11. The system of claim 10, wherein:
the first, second, and third sonar transducer modules comprise three different sonar transducer modules selected from the set of a multichannel sonar transducer module, a side view transducer module, and a down view transducer module.

12. A method comprising:
rendering a historical view selector on a display of a user interface configured to accept user input and display at least first and second sonar image data sets to a user of a mobile structure, wherein the first and second sonar image data sets are derived from corresponding first and second time series of acoustic returns received by respective first and second sonar transducer modules coupled to the mobile structure, and wherein the historical view selector is configured to provide for selection of a particular view time in a period of time associated with the first and/or second sonar image data sets;
receiving user input identifying a selected view time within the period of time; and
rendering first and second portions of the respective first and second image data sets, corresponding to the selected view time, on the display of the user interface.

13. The method of claim 12, wherein the historical view selector comprises:
a timeline indicator comprising a length corresponding to the period of time associated with the first and/or second sonar image data sets;
a user selector rendered over or adjacent to a portion of the timeline indicator, wherein the user input identifying the selected view time comprises user input manipulating a position of the user selector along the length of the timeline indicator; and
a history buffer indicator rendered on a first side of the length of the timeline indicator relative to the user selector and/or a future buffer indicator rendered on a second side of the length of the timeline indicator relative to the user selector, different from the first side of the length of the timeline indicator.

14. The method of claim 12, wherein the historical view selector comprises:
a timeline indicator comprising a length corresponding to the period of time associated with the first and/or second sonar image data sets;
a depth profile indicator rendered along the length of the timeline indicator; and
a water temperature profile indicator rendered along the length of the timeline indicator.

15. The method of claim 12, wherein the historical view selector comprises:
a timeline indicator comprising a length corresponding to the period of time associated with the first and/or second sonar image data sets; and
one or more waypoint indicators rendered along the length of the timeline indicator and configured to indicate corresponding one or more waypoint view times corresponding to when the waypoint was selected, identified, and/or detected within the first and/or second sonar image data sets.

16. The method of claim 12, wherein the historical view selector comprises:
a timeline indicator comprising a length corresponding to the period of time associated with the first and/or second sonar image data sets; and
a view time indicator rendered over at least a portion of the timeline indicator and configured to provide visual feedback of the selected view time relative to the length of the timeline indicator.

17. The method of claim 12, wherein the received user input comprises:
selection of a user selector rendered as part of the historical view selector;
selection of a physical button of the user interface;
movement of a joystick, controller, or cursor of the user interface in a direction against or along a temporal scrolling direction of the first or second sonar image data sets;
swiping, on a touch screen display of the user interface, the first or second sonar image data sets against or along a temporal scrolling direction of the first or second sonar image data sets; or tapping and holding, on a touch screen display of the user interface, a particular position within the first or second sonar image data sets corresponding to the selected view time.

18. The method of claim 12, further comprising rendering a user-selectable timeline play button on the display of the user interface, wherein:
- a first user selection of the timeline play button starts playback of the first and second sonar image data sets from the selected view time at a substantially real time playback speed;
- a plurality of user selections of the timeline play button starts playback of the first and second sonar image data sets from the selected view time at a multiple of the substantially real time playback speed; and/or
- a double user selection of the timeline play button resets the selected view time to a present time and starts a real time playback of the first and second sonar image data sets.

19. The method of claim 12, wherein:
the first and second sonar transducer modules comprise two different sonar transducer modules selected from the set of a multichannel sonar transducer module, a side view transducer module, and a down view transducer module.

20. The method of claim 12, wherein:
- the user interface is configured to display at least a third sonar image data set to the user of the mobile structure;
- the third sonar data set is derived from a corresponding third time series of acoustic returns received by a third sonar transducer module coupled to the mobile structure;
- the historical view selector is configured to provide for selection of a particular view time in a period of time associated with the first, second, and/or third sonar image data sets;
- the method further comprises rendering a third portion of the third image data set, corresponding to the selected view time, on the display of the user; and
- the first, second, and third sonar transducer modules comprise three different sonar transducer modules selected from the set of a multichannel sonar transducer module, a side view transducer module, and a down view transducer module.

* * * * *

UNITED STATES PATENT AND TRADEMARK OFFICE
CERTIFICATE OF CORRECTION

PATENT NO. : 10,852,429 B2  
APPLICATION NO. : 16/029497  
DATED : December 1, 2020  
INVENTOR(S) : Christopher D. Gatland Page 1 of 1

It is certified that error appears in the above-identified patent and that said Letters Patent is hereby corrected as shown below:

In the Specification

In the Cross-Reference to related Applications:

In Column 1, Line 13, delete "Ser."

In Column 1, Line 24, change "application Ser. No. 14/592,134" to --application No. 15/592,134--

In Column 1, Line 31, change "application Ser. No. 14/592,134" to --application No. 15/592,134--

In Column 1, Line 32, delete "Ser."

In the Detailed Description:

In Column 29, Line 35, change "1A-40" to --1A-4C--

In Column 31, Line 39, change "1A-40" to --1A-4C--

Signed and Sealed this  
Ninth Day of February, 2021

Drew Hirshfeld  
*Performing the Functions and Duties of the*  
*Under Secretary of Commerce for Intellectual Property and*  
*Director of the United States Patent and Trademark Office*